(12) United States Patent
Gunter

(10) Patent No.: US 8,499,913 B2
(45) Date of Patent: Aug. 6, 2013

(54) SHAPE MEMORY ALLOY ACTUATOR SYSTEM AND METHOD

(75) Inventor: Ian M. Gunter, Burien, WA (US)

(73) Assignee: The Boeing Company, Chicago, IL (US)

( * ) Notice: Subject to any disclaimer, the term of this patent is extended or adjusted under 35 U.S.C. 154(b) by 143 days.

(21) Appl. No.: 13/112,848

(22) Filed: May 20, 2011

(65) Prior Publication Data

US 2012/0292155 A1 Nov. 22, 2012

(51) Int. Cl.
*F16D 43/25* (2006.01)
*F16D 67/02* (2006.01)
*H02N 10/00* (2006.01)

(52) U.S. Cl.
USPC ....... 192/12 B; 192/48.4; 192/82 T; 192/99 S

(58) Field of Classification Search
None
See application file for complete search history.

(56) References Cited

U.S. PATENT DOCUMENTS

| | | | |
|---|---|---|---|
| 4,046,236 A * | 9/1977 | Hershman et al. | 192/223 |
| 4,290,393 A * | 9/1981 | Hart et al. | 123/41.12 |
| 5,127,228 A | 7/1992 | Swenson | |
| 6,065,934 A | 5/2000 | Jacot et al. | |
| 6,499,952 B1 | 12/2002 | Jacot et al. | |
| 7,037,076 B2 | 5/2006 | Jacot et al. | |
| 7,516,680 B2 | 4/2009 | Clingman et al. | |
| 7,771,392 B2 * | 8/2010 | De Polo et al. | 604/152 |
| 8,172,811 B2 * | 5/2012 | Roe | 604/207 |
| 2007/0074753 A1 * | 4/2007 | Altali et al. | 136/243 |
| 2009/0212158 A1 * | 8/2009 | Mabe et al. | 244/1 N |
| 2010/0018823 A1 * | 1/2010 | Melz et al. | 192/40 |
| 2010/0065679 A1 | 3/2010 | Clingman et al. | |
| 2011/0114434 A1 * | 5/2011 | Mankame et al. | 192/35 |

FOREIGN PATENT DOCUMENTS

GB  2450793  1/2009

OTHER PUBLICATIONS

U.S. Appl. No. 13/019,973 entitled Shape Memory Alloy Actuated Torsion Lock, filed Feb. 2, 2011.
International Search Report for PCT/US2012/033111 dated Feb. 13, 2013.

* cited by examiner

*Primary Examiner* — David D Le
*Assistant Examiner* — Mark Manley

(57) ABSTRACT

An actuator assembly may comprise a housing, a shaft, a shape memory alloy (SMA) torque tube, and first and second unidirectional bearings. The SMA torque tube may rotate the shaft. The first unidirectional bearing may limit rotation of the shaft relative to the SMA torque tube to a first direction. The second unidirectional bearing may prevent rotation of the shaft relative to the housing along a second direction opposite the first direction.

19 Claims, 21 Drawing Sheets

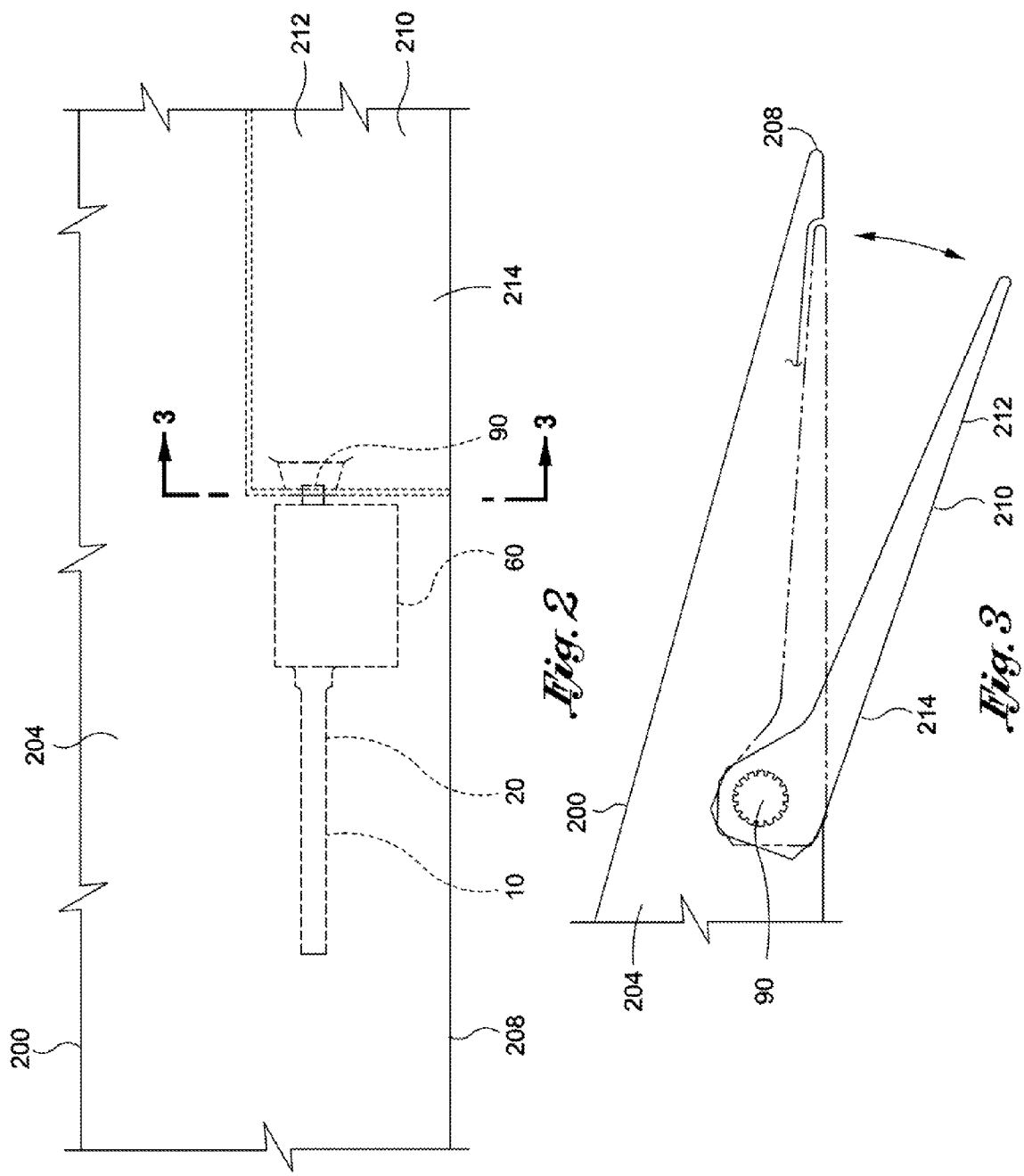

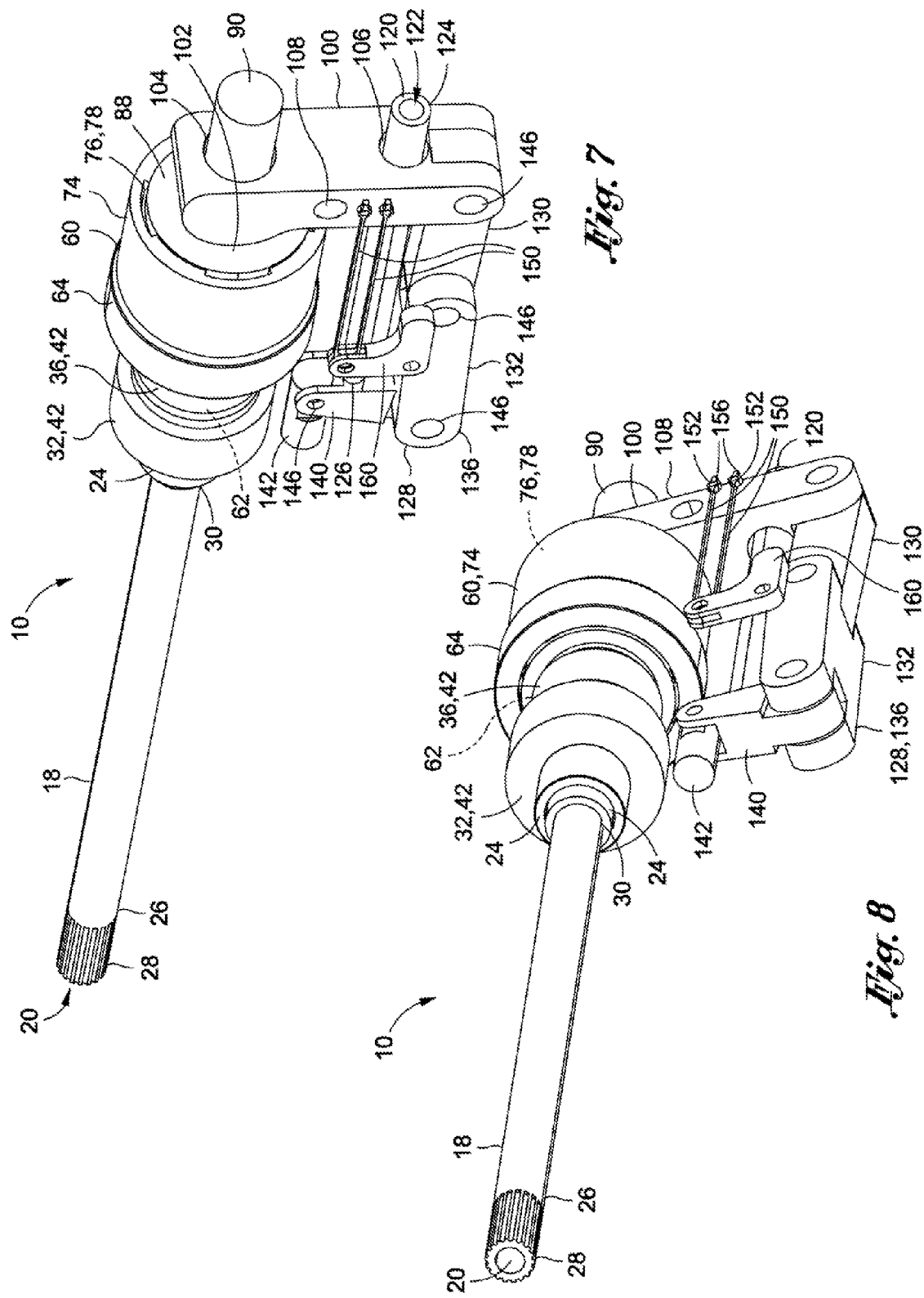

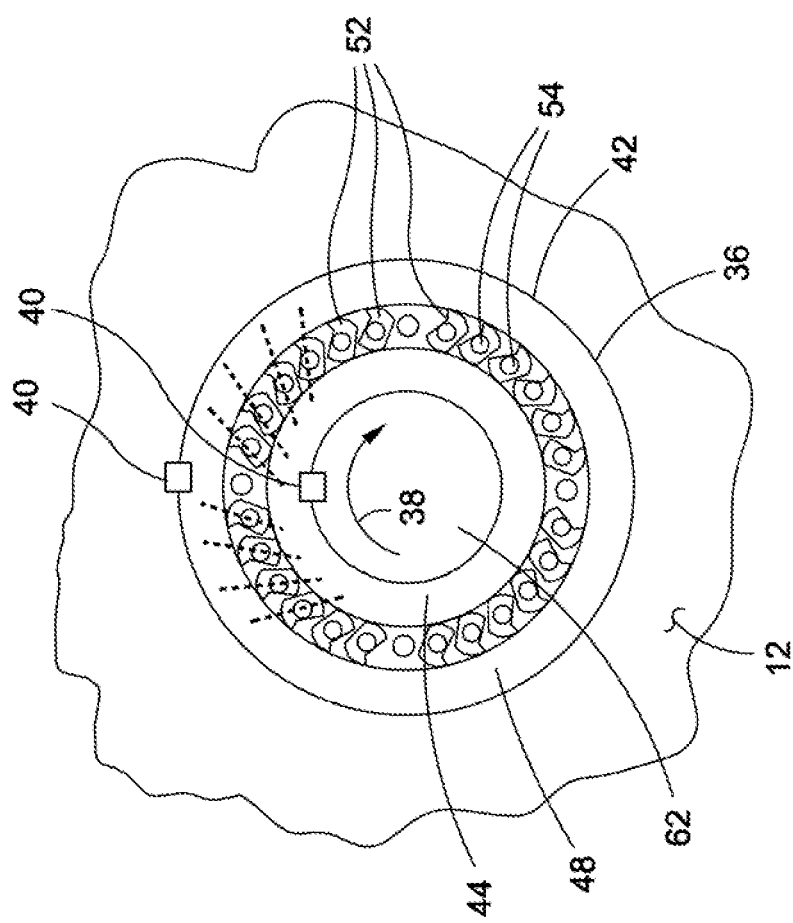

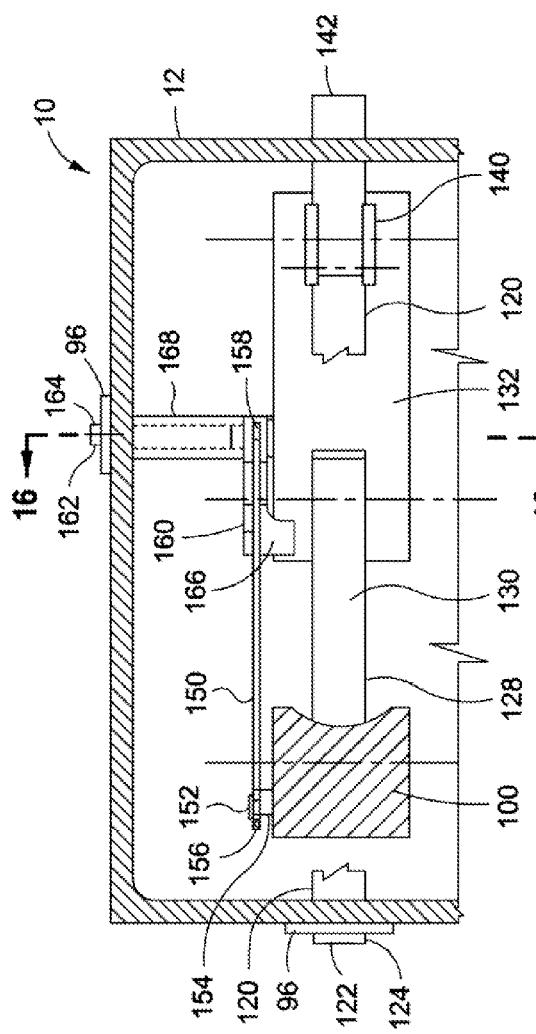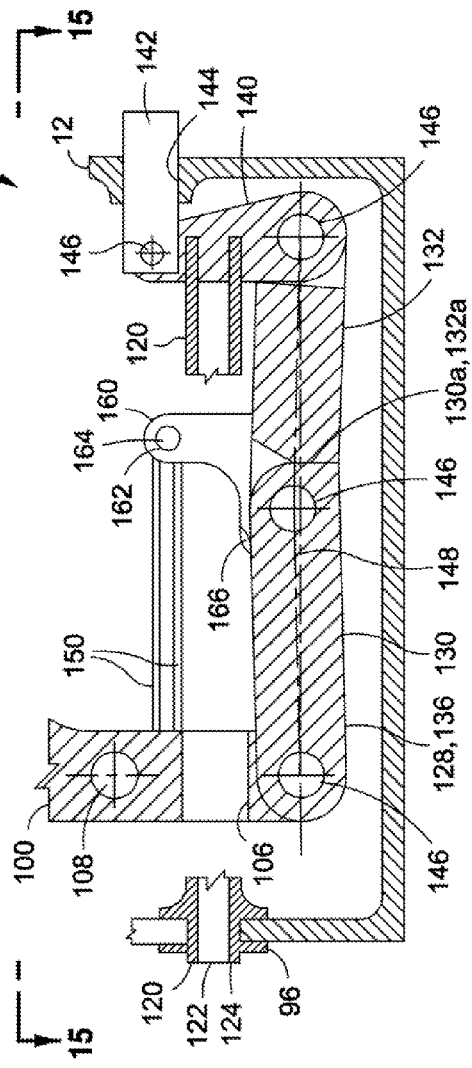

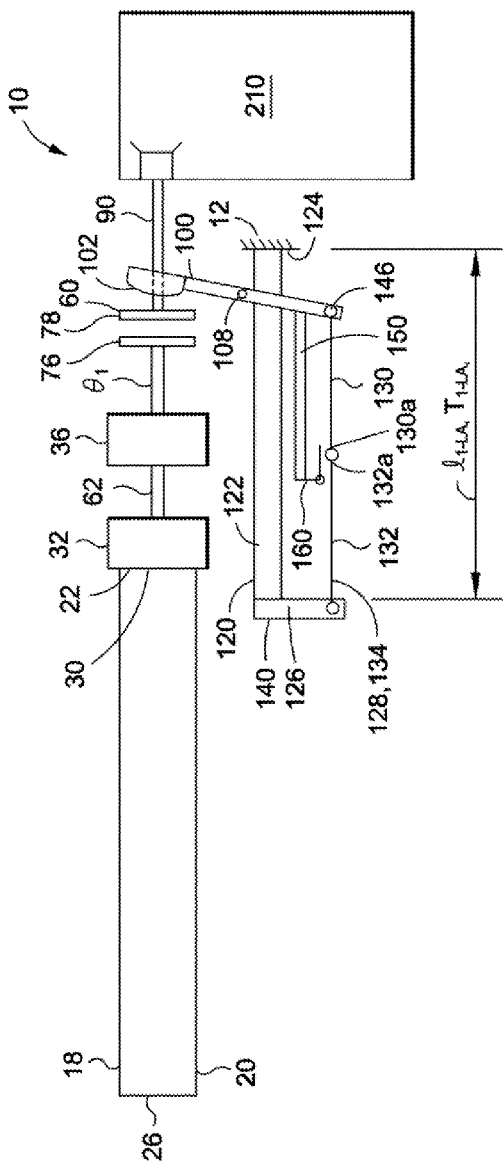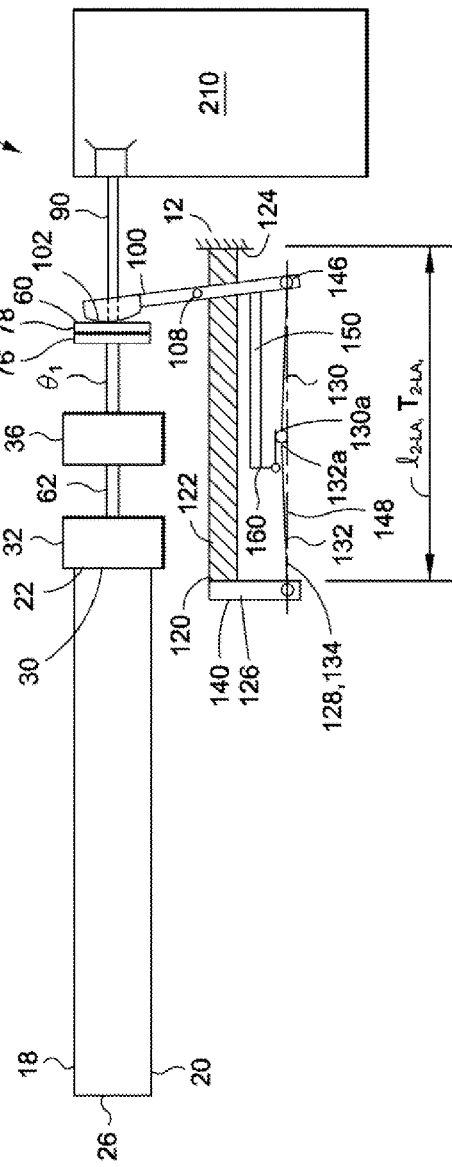

SHAPE MEMORY ALLOY ACTUATOR SYSTEM AND METHOD

FIELD

The present disclosure relates generally to actuator systems and, more particularly, to a shape memory alloy torsion actuator, lock and retract mechanism.

BACKGROUND

Aircraft typically include a variety of movable aerodynamic devices for directional control of the aircraft and for altering the lift characteristics of the aircraft. For example, fixed wing aircraft typically includes slats and flaps mounted to the leading and trailing edges of the wings. Certain aircraft may include Krueger flaps mounted to the inboard section of the wings on the leading edge and slats mounted to the outboard section of the wings on the leading edge. Krueger flaps and slats may be deployed from the leading edge of the wings during certain phases of flight in order to increase effective wing camber and maintain airflow over the wings at high angles of attack.

Flaps may also be mounted to the trailing edges of the wings in order to increase the lift generated by the wings when the aircraft is moving at relatively low airspeeds. For example, trailing edge flaps may be deployed generally downwardly during takeoff to increase lift and may then be retracted during the cruise portion of the flight. The trailing edge flaps may again be deployed during the approach and landing phases of the flight in order to increase lift by increasing effective wing camber and wing area to compensate for the lower airspeed of the aircraft.

In addition, certain aircraft may include Gurney flaps which may be mounted to the wings to improve lift. Gurney flaps may be configured as small spanwise protrusions which may be deployable generally perpendicularly from the wing trailing edge on the underside of the wings to increase the wing lift coefficient when the aircraft is moving at relatively high airspeeds such as during cruise flight. Gurney flaps may increase the wing lift coefficient without significantly increasing drag by extending no further than the boundary layer of airflow passing over the wings. Gurney flaps may maintain attachment of the airflow over the wing surface and thereby improve the aerodynamic efficiency of the wings which may reduce fuel consumption.

Aerodynamic devices such as the above-mentioned flaps and slats are required by the Federal Aviation Administration (FAA) to include a locking mechanism for maintaining the device in the selected deployed position without intervention by the pilot. FAA regulations additionally allow for automatic retraction of aerodynamic devices from the deployed position in certain circumstances. For example, aerodynamic devices may be automatically retracted upon the aircraft encountering wind shear to avoid overloading the wing structure. For an aircraft fitted with Gurney flaps and moving at 500 to 600 miles per hour typical of cruise flight, it may be necessary to retract or release the Gurney flaps in a relatively short period of time (e.g., less than 300 milliseconds) to prevent overloading the wing.

The prior art includes several actuators such as hydraulic and electro-mechanical actuators for deploying and retracting aerodynamic devices. Although generally effective for their intended purpose, hydraulic and electro-mechanical actuators may have a relatively low specific holding torque for maintaining an aerodynamic device in a deployed position and therefore must be relatively large in physical size to generate sufficient holding torque to lock the aerodynamic device in the deployed position. Unfortunately, the relatively large physical size of prior art actuators presents challenges in integrating the actuator into the narrow confines of the wing trailing edge. In addition, the relatively large physical size of such actuators increases weight, complexity and cost of the aircraft. Furthermore, such prior art actuators may lack the ability to retract or release an aerodynamic device such as a Gurney flap from its deployed position in an extremely short period of time upon encountering wind shear for an aircraft moving at relatively high airspeeds.

As can be seen, there exists a need in the art for an actuator which is of relatively small size and which can generate a relatively large amount of holding torque for maintaining a deployable device in a deployed position. Furthermore, there exists a need in the art for an actuator capable of retracting or releasing a deployed device in a relatively short period of time on the order of milliseconds.

SUMMARY

The above-noted needs associated with actuator systems are specifically addressed and alleviated by the present disclosure which, in an embodiment, provides an actuator assembly having a housing, a shaft, a shape memory alloy (SMA) torque tube, and first and second unidirectional bearings. The SMA torque tube may rotate the shaft. The first unidirectional bearing may limit rotation of the shaft relative to the SMA torque tube to a first direction. The second unidirectional bearing may prevent rotation of the shaft relative to the housing along a second direction opposite the first direction.

In a further embodiment, disclosed is an over-center linkage, an SMA linear actuator, and an SMA ribbon. The SMA linear actuator may be coupled to the over-center linkage and may linearly contract when heated causing locking of the over-center linkage and engagement of the clutch. The SMA ribbon may linearly contract when heated causing collapse of the over-center linkage and disengagement of the clutch.

Also disclosed is a method of rotating a shaft relative to a housing. The method may include heating an SMA torque tube and twisting the SMA torque tube in response to heating thereof. The method may further include rotating the shaft in response to twisting the SMA torque tube. Additionally, the method may include limiting rotation of the shaft relative to the SMA torque tube to a first direction using a first unidirectional bearing, and preventing rotation of the shaft relative to the housing along a second direction opposite the first direction using a second unidirectional bearing.

In a further embodiment, disclosed is a method of disengaging a clutch including the steps of coupling the clutch to an over-center linkage, and heating an SMA ribbon coupled to the over-center linkage. The method may further include linearly contracting the SMA ribbon in response to the heating thereof. In addition, the method may include collapsing the over-center linkage in response to linearly contracting the SMA ribbon, and disengaging the clutch in response to collapsing the over-center linkage.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein:

FIG. 2 is a top view of a portion of the trailing edge of the aircraft wing taken along line 2 of FIG. 1 and illustrating an actuator system operatively coupled to a split flap mounted to the trailing edge of the wing;

FIG. 3 is a sectional view of the trailing edge of the wing taken along line 3 of FIG. 2 and illustrating the deployed position of the split flap;

FIG. 7 is a forward perspective illustration of the actuator system with the housing omitted for clarity in illustrating the components that make up the actuator system;

FIG. 8 is an aft perspective illustration of the actuator system with the housing omitted;

FIG. 10 is a sectional illustration of the actuator system taken along line 10 of FIG. 6 and illustrating a second unidirectional bearing coupling the clutch shaft to the housing;

FIG. 14 is side sectional illustration of the actuator system taken along line 14 of FIG. 5 and illustrating a bellcrank for coupling the SMA ribbon to the over-center linkage;

FIG. 15 is a top sectional illustration of the actuator system taken along line 15 of FIG. 14 and illustrating the SMA ribbon extending between the yoke;

FIG. 20 is a schematic illustration of the actuator system wherein the SMA linear actuator and the SMA ribbons are in their martensite lengths (i.e., un-contracted lengths and the clutch is disengaged;

FIG. 21 is a schematic illustration of the actuator system wherein the SMA linear actuator is heated causing linear contraction from a first length corresponding to the martensite condition to a second length corresponding to an austenite condition and resulting in movement of the over-center linkage into a locked position and engagement of the clutch;

DETAILED DESCRIPTION

Figure 1:
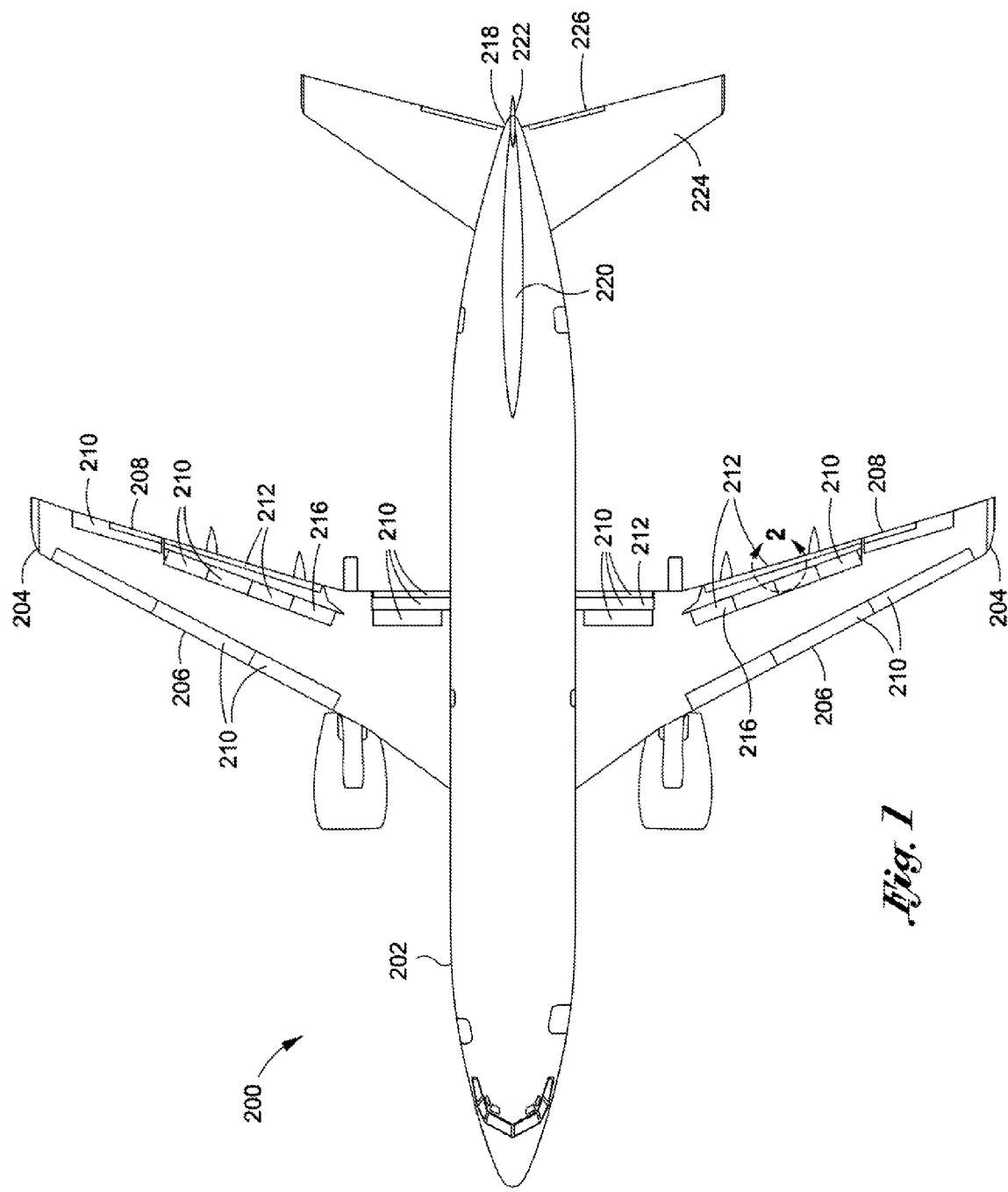
FIG. 1 is a top view illustration of an aircraft having one or more deployable devices which may be mounted to the aircraft such as to the leading and trailing edges of the aircraft wings.

Referring now to the drawings wherein the showings are for purposes of illustrating various embodiments of the disclosure, shown in FIG. 1 is a top view of an aircraft 200 which may incorporate an actuator system 10 (FIG. 2) as disclosed herein. The actuator system 10 (FIG. 2) may be adapted for deploying any number of deployable devices 210 including, but not limited to, aerodynamic devices 212 which may be mounted to the aircraft 200 illustrated in FIG. 1. The aircraft 200 may include a fuselage 202 having an empennage 218 which may include a horizontal stabilizer 224, an elevator 226, a vertical stabilizer 220 and a rudder 222 for directional control.

The aircraft 200 in FIG. 1 may include a variety of aerodynamic devices 212 mounted to the leading and trailing edges 206, 208 of the wings 204 for altering the lift and drag characteristics of the wings 204. For example, the aerodynamic devices 212 may comprise leading edge 206 slats and/or flaps such as Krueger flaps which may be deployable from the leading edge 206 of the wings 204 to increase the effective camber of the wings 204 and maintain airflow over the upper surfaces of the wings 204 at high angles of attack. The wings 204 may also include spoilers 216 for reducing the lift of the wings 204 such as during landing such that the weight of the aircraft 200 may be transferred to the landing gear for improved braking. The trailing edge 208 of the wing 204 may incorporate any number of aerodynamic devices 212 including flaps mounted to the trailing edges 208 of the wings 204. The flaps may be of any configuration without limitation including splits flaps, slotted flaps and Gurney flaps for improving the lift characteristics of the wings 204.

Referring to FIG. 2, shown is a portion of the trailing edge 208 of the wing 204 of FIG. 1 and illustrating an actuator system 10 operatively coupled to a deployable device 210 such as the split flap 214. The actuator system 10 in FIG. 2 may be configured to deploy and retract the split flap 214. For example, the split flap 214 may be deflected downwardly during deployment as shown in FIG. 3 such as by heating a shape memory alloy (SMA) torque tube 18 (FIG. 6) causing rotation of the deployable device 210. As will be described in greater detail below, the actuator system 10 (FIG. 2) advantageously includes an SMA linear actuator 120 (FIG. 4) for applying a relatively high axial force on the clutch 60 to provide a relatively high specific holding torque for maintaining a deployed position of the deployable device 210 under load. In addition, the actuator system 10 (FIG. 2) advantageously includes unidirectional bearings 32, 36 (FIG. 6) for passively locking the deployable device 210 in the desired position after deployment by the SMA torque tube 18. Furthermore, the actuator system 10 advantageously includes one or more SMA wires or ribbons 150 (FIG. 7) for rapidly releasing the deployable device 210 when desired. For example, the actuator system 10 may maintain the split flap 214 (FIG. 3) at a desired flap setting and may rapidly release the split flap 214 in a relatively short period of time (e.g., less than 300 milliseconds) when the aircraft 200 encounters turbulence or other loading conditions.

Figure 4:
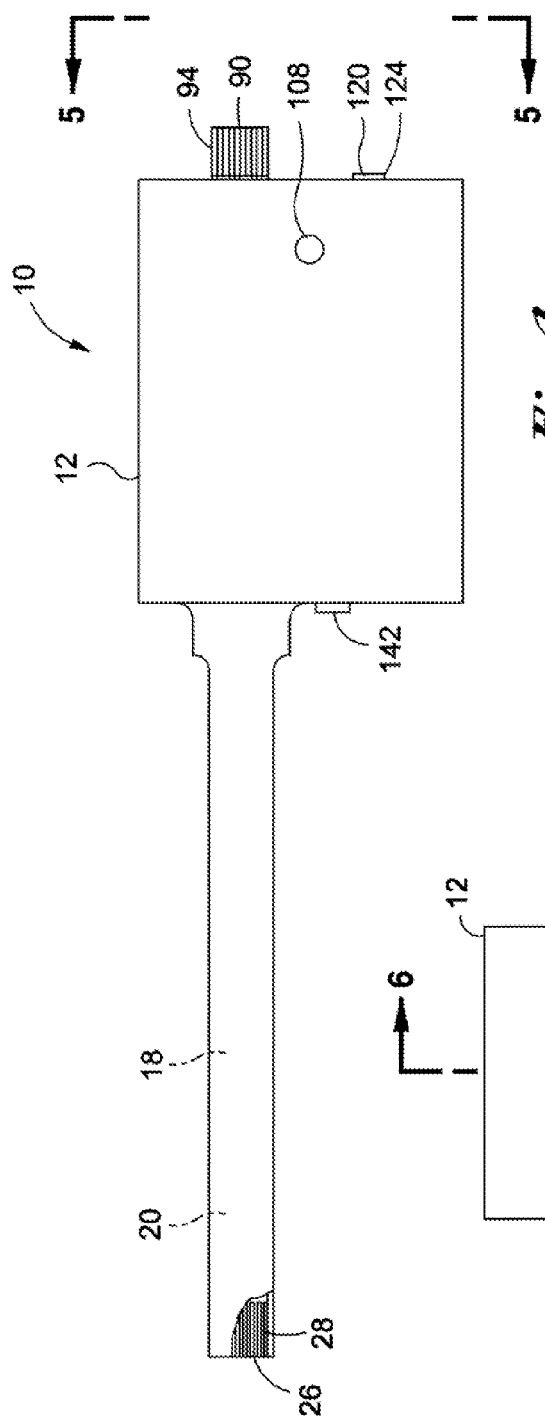
FIG. 4 is a side view of the actuator system illustrating a housing of the actuator system and an output shaft extending from the housing.

Referring to FIG. 4, shown is a side view of the actuator system 10 housed within a housing 12. The actuator system 10 may include a shape memory alloy (SMA) torque tube 18 for deploying and retracting the deployable device 210 (FIG. 2). The SMA torque tube 18 may include a fixed end 26 having splines 28 or other features for fixedly coupling the fixed end 26 to the housing 12. The deployable device 210 (FIG. 2) may be mounted to an output shaft 90 of the actuator system 10. The SMA torque tube 18 may be trained to twist when heated causing deployment of the deployable device 210 (FIG. 2) as described below. The deployable device 210 may include a position sensor (not shown) to monitor the position of the deployable device 210 for feedback control of the SMA torque tube 18.

Figure 5:
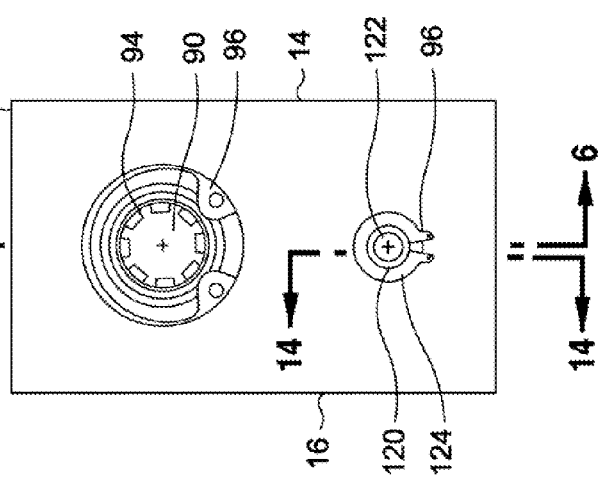
FIG. 5 is an end view of the actuator system taken along line 5 of FIG. 4 and illustrating the output shaft and a shape memory alloy (SMA) linear actuator coupled to the housing.

Referring to FIG. 5, shown is an end view of the housing 12 illustrating the output shaft 90 which may be retained within the housing 12 by a retainer mechanism 96 such as an internal snap ring or by other suitable means. Also shown is a fixed end 124 of the SMA linear actuator 120 which may be fixedly coupled to the housing 12 and retained to the housing 12 by a retainer mechanism 96 such as an external snap ring or other means. The housing 12 may be comprised of a first housing portion 14 and a second housing portion 16 which may be divided along a vertical parting plane to facilitate assembly and maintenance of the actuator system 10. However, the housing 12 may be provided in alternative configurations including, but not limited to, a unitary housing configuration or housing configurations includes more than two housing portions. Further in this regard, it is contemplated that the housing 12 may comprise one or more mounting brackets (not shown) or fittings (not shown) for mounting the components of the actuator system 10 to a structure such as an internal structure (not shown) of a wing. In this regard, the housing 12 is not necessarily limited to a housing configuration wherein the actuator system 10 components are contained within an interior of the housing 12.

Figure 6:
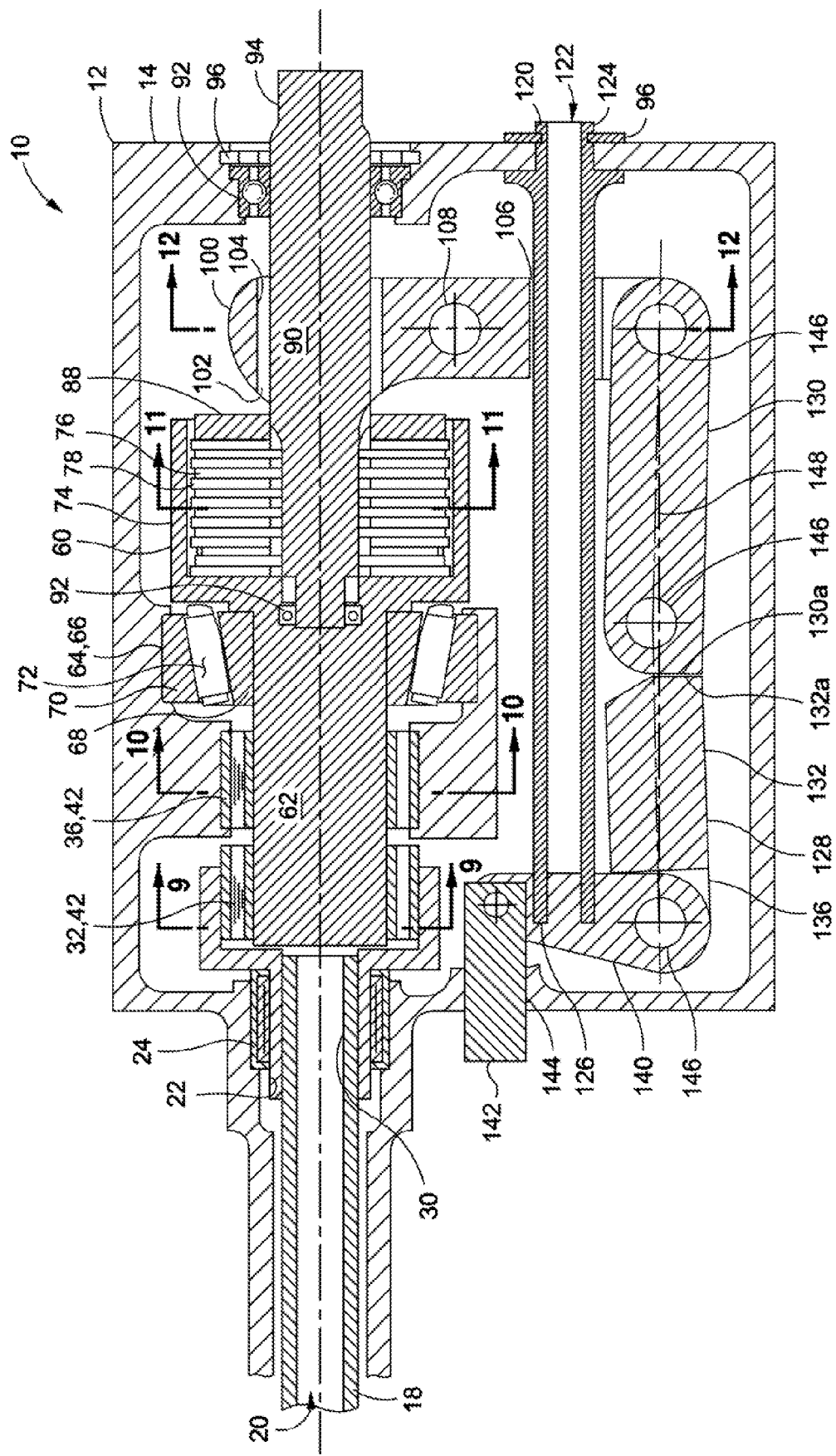
FIG. 6 is a sectional illustration of the actuator system taken along line 6 of FIG. 5 and illustrating an SMA torque tube, a clutch, an over-center linkage, and the SMA linear actuator for engaging the clutch such that rotational motion of the SMA torque tube is transmitted through the clutch to the output shaft.

Referring to FIGS. 6-8, shown are the components of the actuator system 10. FIG. 6 illustrates the components housed within the housing 12. As shown in FIG. 6, the SMA torque tube 18 extends from the fixed end 26 (FIG. 4) through an elongated portion of the housing 12. A drive end 30 of the SMA torque tube 18 may be rotatably supported by a torque tube bearing 24 (FIG. 6) such as a needle bearing that may be mounted to the housing 12. As shown in FIG. 6, the SMA torque tube 18 may include a hollow interior for housing 12 a heater 122 for heating the SMA torque tube 18.

The SMA torque tube 18 may be formed of a suitable SMA material. For example, the SMA material may comprise nickel-titanium such as nitinol. The SMA material may have a two-way shape effect to allow the SMA torque tube 18 to twist from an original shape to a trained shape and twist back from the trained shape to the original shape. The SMA torque tube 18 may be trained to twist by repeatedly torquing the SMA torque tube 18 to a predetermined stress level (e.g., 15-20 ksi). When the SMA torque tube 18 is heated above a transition temperature, the SMA material reaches an austenite condition causing the SMA torque tube 18 to untwist and resume its original pre-twisted shape. When heat is allowed to dissipate such that the SMA torque tube 18 cools below the transition temperature, the SMA torque tube 18 returns to its original shape in the martensite condition. In this manner, the SMA torque tube 18 provides a means for deploying the deployable device 210 (FIG. 2) by heating the SMA torque tube 18. The clutch 60 and the first and second unidirectional bearings 32, 36 maintain the deployable device 210 in the deployed position while the SMA torque tube 18 is allowed to cool and return to its original untwisted shape.

FIG. 6 illustrates an SMA end fitting 22 of the SMA torque tube 18 coupled to the clutch shaft 62 by a first unidirectional bearing 32. The clutch shaft 62 may be rotatably supported or coupled to the housing 12 by means of a second unidirectional bearing 36. The first unidirectional bearing 32 limits rotation of the clutch shaft 62 relative to the SMA torque tube 18 to a first direction 34. The second unidirectional bearing 36 prevents rotation of the clutch shaft 62 relative to the housing 12 along a second direction 38 opposite the first direction 34. The first and second unidirectional bearings 32, 36 provide a means to passively lock the clutch shaft 62 and the deployable device 210 in a desired rotational position after deployment by the SMA torque tube 18. Such an arrangement may obviate the need to continuously supply electrical power to heat to the SMA torque tube 18 to maintain the deployable device 210 (FIG. 3) in the deployed position. In this manner, the actuator assembly 10 may advantageously reduce consumption of electrical power from the aircraft power system.

Figure 9B:
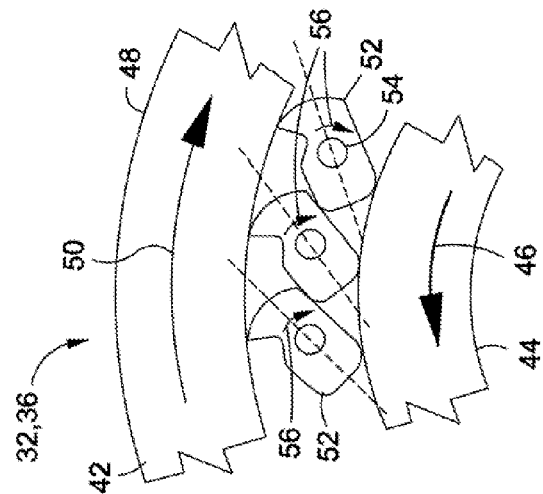
FIG. 9B is a sectional illustration of the portion of the first unidirectional bearing taken along line 9B of FIG. 9 and illustrating the inner and outer races rotating in opposite directions relative to one another.
Figure 9:
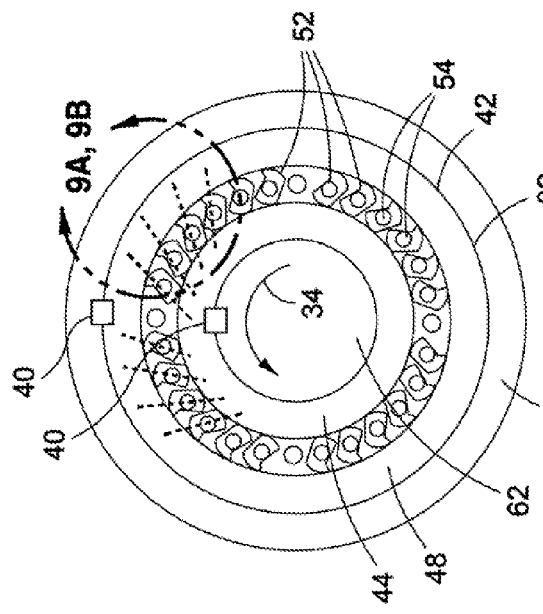
FIG. 9 is a sectional illustration of the actuator system taken along line 9 of FIG. 6 and illustrating a first unidirectional bearing coupling a clutch shaft to the SMA torque tube.

FIG. 9 illustrates the first unidirectional bearing 32 coupling the clutch shaft 62 to the SMA torque tube 18 (FIG. 6). In a non-limiting embodiment, the first unidirectional bearing 32 may be configured as a sprag bearing 42 having coaxial inner and outer races 44, 48 and a plurality of sprags 52 that limit rotation of the inner and outer races 44, 48 to a single direction relative to one another. The outer race 48 may be mounted non-rotatably coupled to the SMA end fitting 22 by means of a key 40 or other means. The inner race 44 may be non-rotatably coupled to the clutch shaft 62 by means of a key 40 or other means to fixedly couple the inner race 44 to the clutch shaft 62.

Figure 9A:
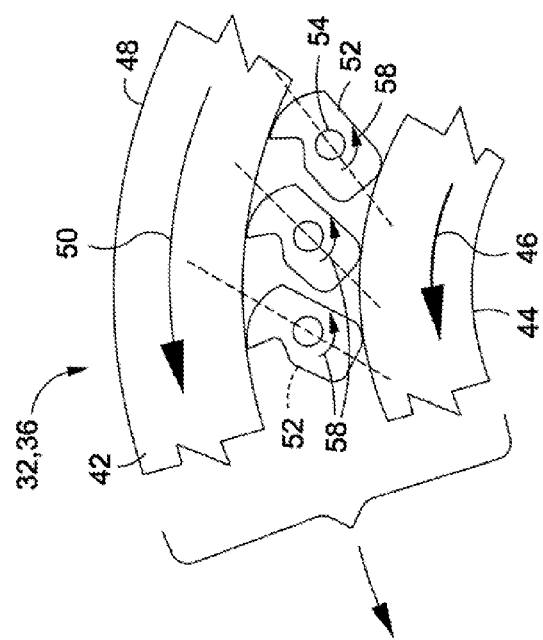
FIG. 9A is a sectional illustration of a portion of the first unidirectional bearing taken along line 9A of FIG. 9 and illustrating inner and outer races rotating in the same direction.

FIG. 9A is an enlarged view of a portion of the sprag bearing 42 of FIG. 9 and illustrating a plurality of sprags 52 limiting rotation of the inner race 44 relative to the outer race 48 to a single direction. Each one of the sprags 52 may be rotatable about a sprag pivot 54 along a direction of rotation 56 that allows rotation of the inner race 44 relative to the outer race 48. Conversely, FIG. 9B illustrates the rotation of the sprags 52 in an opposite direction 58 as may occur during attempts to rotate the inner race 44 along a direction of rotation 46 that is opposite to the direction of rotation 50 of the outer race 48. The sprags 52 may optionally be spring-loaded to maintain substantially continuous contact with the inner and outer races 46, 48 to minimize backlash.

FIG. 10 illustrates the second unidirectional bearing 36 coupling the clutch shaft 62 to the housing 12. The outer race 48 of the second unidirectional bearing 36 may be coupled to the housing 12 by means of a key 40. Likewise, the inner race 44 of the second unidirectional bearing 36 may be coupled to the clutch shaft 62 by means of a key 40. The second unidirectional bearing 36 may be arranged in the same orientation as the first unidirectional bearing 32 (FIG. 9) to prevent rotation of the clutch shaft 62 relative to the housing 12 along a second direction 38 opposite the first direction 34. For example, the sprags 52 of the first unidirectional bearing 32 may be oriented in the same direction as the sprags 52 of the second unidirectional bearing 36. Collectively, the first and second unidirectional bearings 32, 36 form a passive lock for limiting rotation of the clutch shaft 62 to a single direction while allowing the SMA torque tube 18 (FIG. 6) to return to its original shape after the SMA torque tube 18 rotates the clutch shaft 62 to the desired rotational position.

Although the first and second unidirectional bearings 32, 36 are described as sprag bearings 42, other unidirectional bearing configurations are contemplated for coupling the clutch shaft 62 to the SMA torque tube 18 and for coupling the clutch shaft 62 to the housing 12. For example, the unidirectional bearings may be configured as unidirectional ball bearings (not shown). Even further, the unidirectional bearings may be configured as a ratchet-and-pawl arrangement (not shown).

Referring to FIG. 6, the clutch shaft 62 and clutch 60 may be supported by a thrust bearing 64 that may be mounted to the housing 12. The thrust bearing 64 may radially (i.e., rotatably) support the clutch shaft 62. In addition, the thrust bearing 64 may be in axial contact with the clutch cup 74 of the clutch 60 to provide axial resistance against axial loads placed on the clutch 60 during engagement. Such axial loads may be applied by the SMA linear actuator via a yoke 100. The yoke may include one or more protrusions 102 as best seen in FIG. 7. A protrusion 102 of the yoke 100 may apply axial pressure to a thrust bearing 64. The thrust bearing 64 may distribute the pressure from the yoke 100 to the clutch plates 76, 78 causing relative axial motion and engagement of the inner and outer clutch plates 76, 78.

In FIG. 6, in a non-limiting embodiment, the thrust bearing 64 may be configured as a tapered roller bearing. The tapered roller bearing 66 may be comprised of inner and outer races 68, 70 which may have conical surfaces and a plurality of rollers 72 captured between the inner and outer races 68, 70. The rollers 72 may be angularly (i.e., conically) oriented as shown in FIG. 6 to provide radial support for the clutch shaft 62 and axial support for the clutch 60. Although the thrust bearing 64 is shown as a tapered roller bearing 66, any bearing configuration capable of providing radial and axial support for the clutch shaft 62 and clutch 60 may be incorporated into the actuator system 10.

Figure 11:
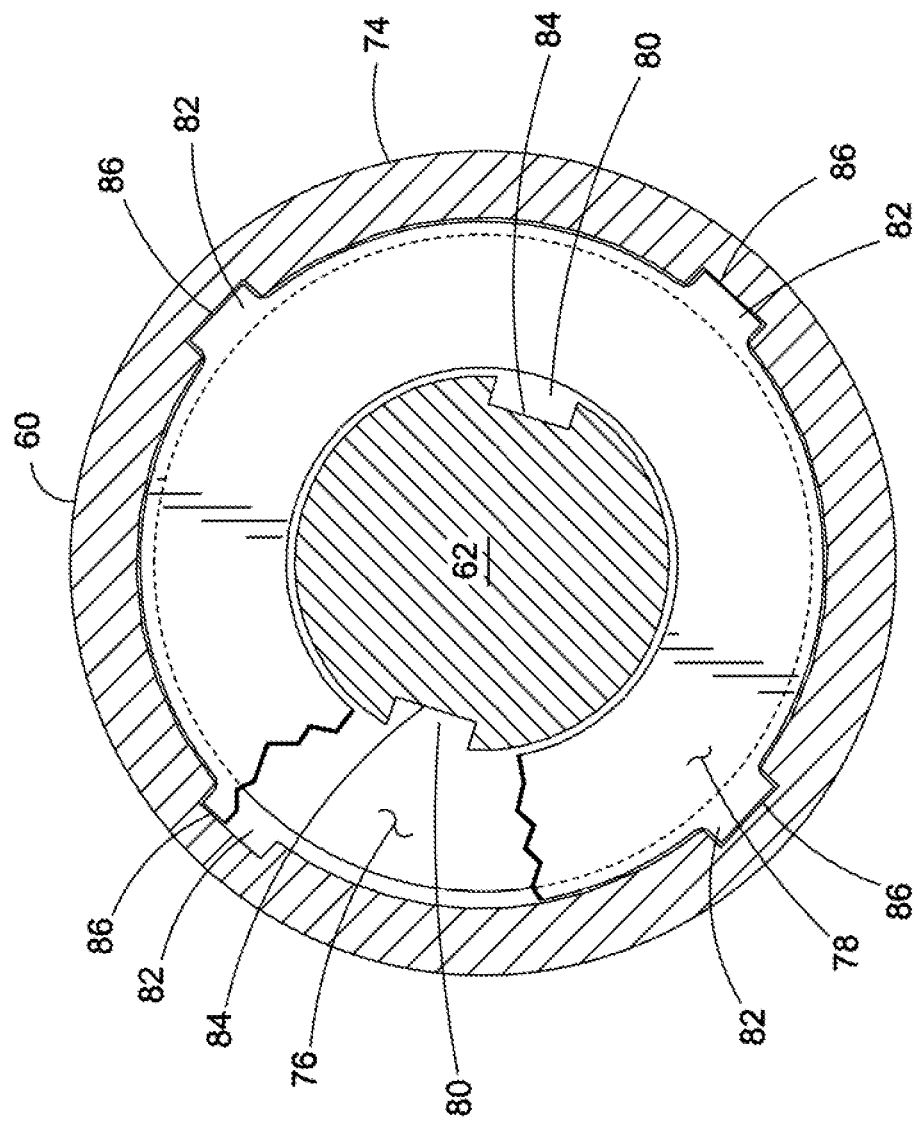
FIG. 11 is a sectional illustration of the actuator system taken along line 11 of FIG. 6 and illustrating inner and outer clutch plates respectively coupled to the output shaft and a clutch cup.

FIG. 6 further illustrates the clutch 60 including the clutch cup 74 and having a plurality of inner and outer clutch plates 76, 78. The inner clutch plates 76 may be non-rotatably engaged to an output shaft 90. The outer clutch plates 78 may be non-rotatably engaged to the clutch cup 74. For example, FIG. 11 illustrates a plurality of tangs 80 formed on the inner clutch plates 76. Each one of the tangs 80 may be non-rotatably engaged to axially-extending shaft grooves 84 formed along the output shaft 90. FIG. 11 further illustrates a plurality of lobes 82 formed on the outer clutch plates 78. The lobes 82 may be non-rotatably engaged to axially-extending cup grooves 86 formed within the interior surface of the clutch cup 74.

The inner clutch plates 76 may be substantially equal in quantity to the outer clutch plates 78. However, the inner and outer clutch plates 76, 78 may be provided in unequal quantities. Furthermore, although FIG. 6 illustrates a total of fourteen inner and outer clutch plates 76, 78, any quantity may be provided to provide the desired amount of holding torque for the clutch 60. The quantity of inner and outer clutch plates 76, 78, may be selected based upon the amount of surface area required to provide the necessary holding torque for reacting aerodynamic loads that may be imposed on the deployable device 210 (FIG. 3).

FIG. 6 further illustrates the output shaft 90 rotatably supported by bearings 92 located at opposed ends of the output shaft 90. For example, a left-hand side of the output shaft 90 may be rotatably supported by a bearing 92 mounted within the clutch shaft 62. A right-hand side of the output shaft 90 may be rotatably supported by a bearing 92 mounted to the housing 12. The bearing 92 may be retained to the housing 12 by a retainer mechanism 96 or other suitable means.

Figure 12:
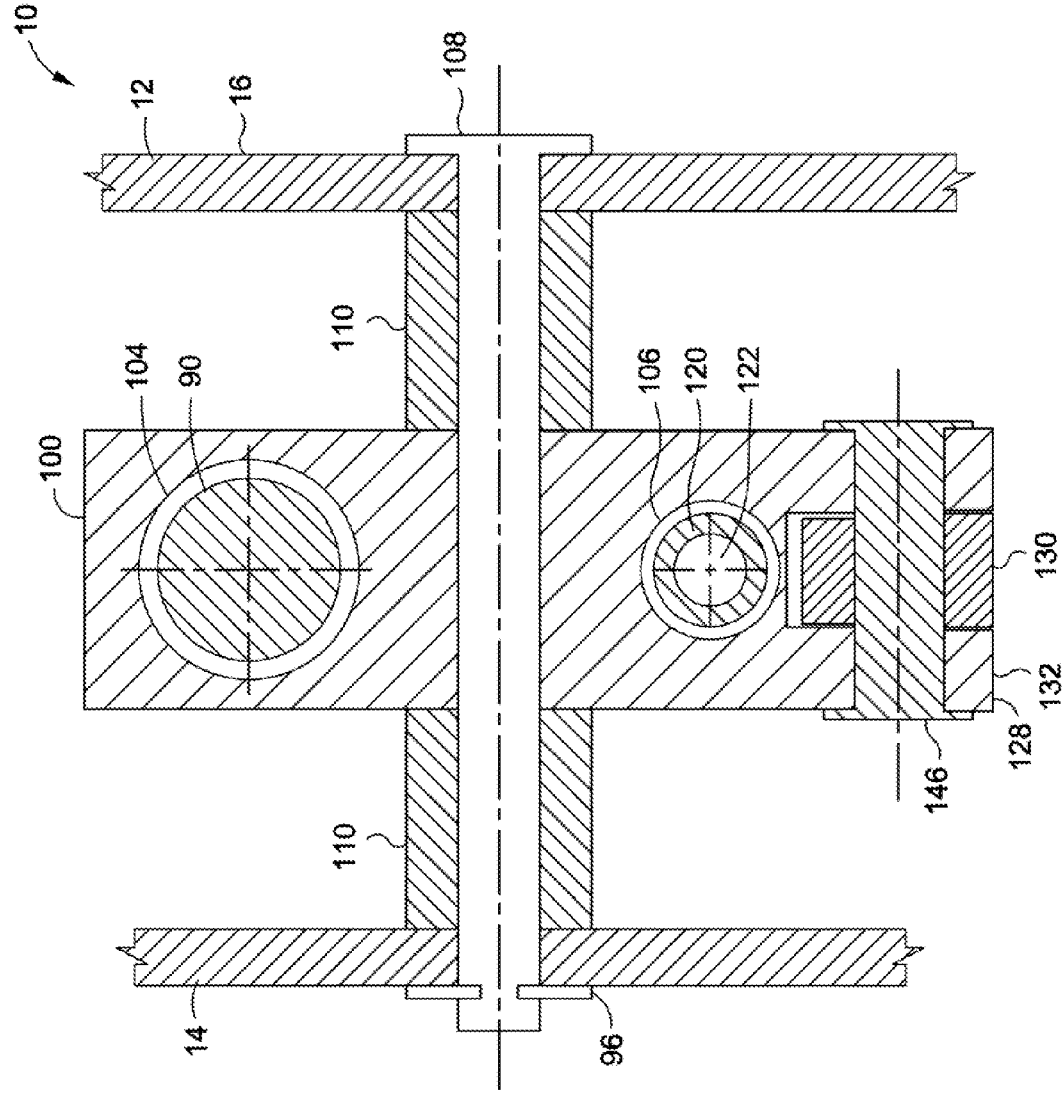
FIG. 12 is a sectional illustration of the actuator system taken along line 12 of FIG. 6 and illustrating a yoke pivotably mounted to the housing.
Figure 13:
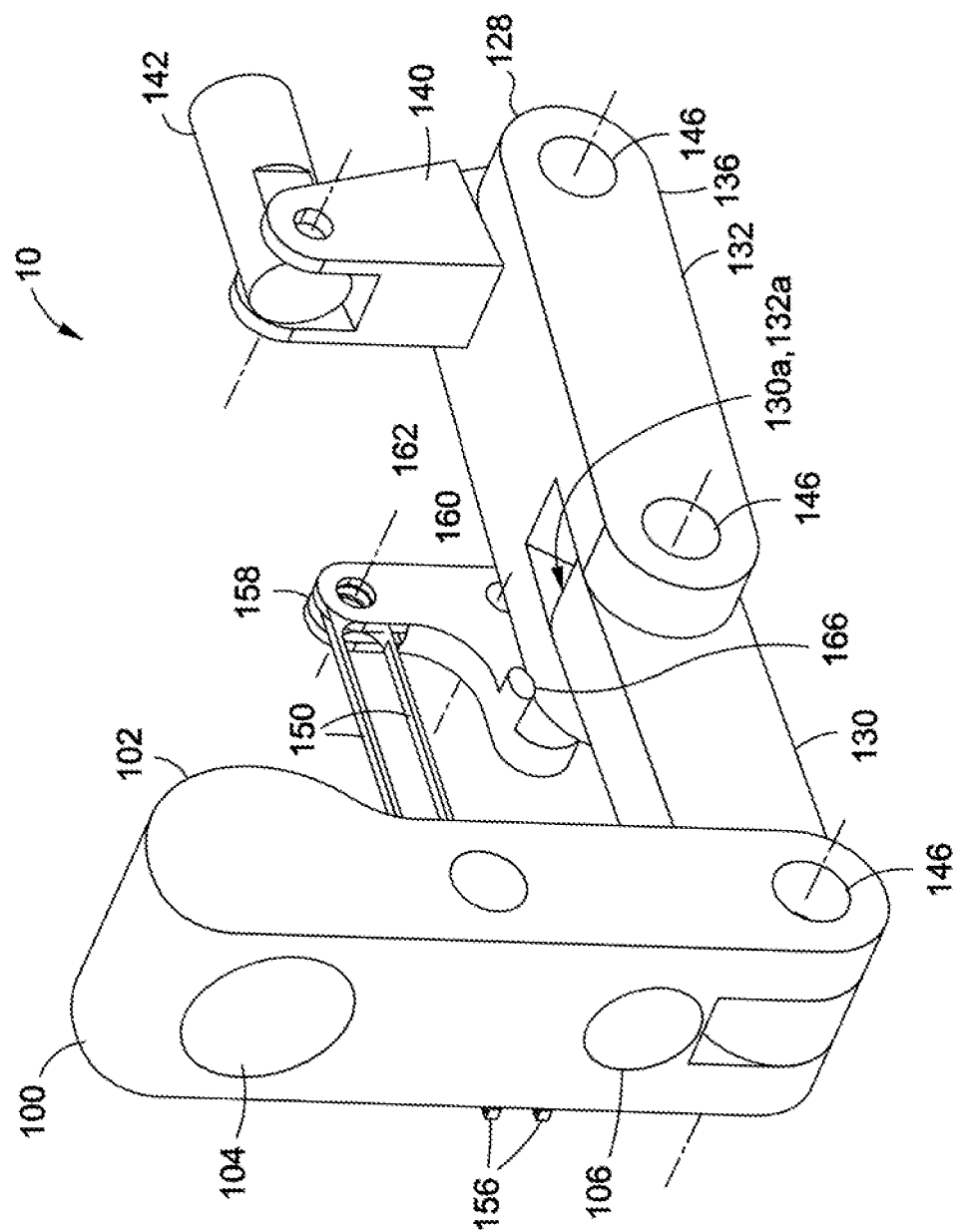
FIG. 13 is a perspective illustration of an SMA ribbon coupled to an over-center linkage for disengaging the clutch.

The yoke 100 may be pivotably mounted to the housing 12 and may include a bore 104 to allow the output shaft 90 to extend through the yoke. However, the yoke 100 may be provided in alternative configurations such as a fork-shaped configuration (not shown) for accommodating the output shaft 90. The yoke 100 may additionally include a bore 106 through which the SMA linear actuator 120 may pass. As shown in FIG. 12, the yoke 100 may be mounted to the housing 12 on a pivot pin 108 which may be retained to the housing 12 by means of a retainer mechanism 96. A pair of spacers 110 on opposite sides of the yoke 100 may maintain the lateral position of the yoke 100.

The yoke 100 may transmit pressure to the inner and outer clutch plates 76, 78 by means of the protrusion 102 which bears against the bearing plate 88. The bearing plate 88 may be mounted to the output shaft 90 and may bear against the inner and outer clutch plates 76, 78. The bearing plate 88 may be configured to accommodate rotation of the clutch plates 76, 78 while the yoke 100 is applying pressure to the bearing plate 88.

Referring to FIGS. 6-8, shown is the interconnection of the yoke 100 to the over-center linkage 128. The over-center linkage 128 may be comprised of a first link 130 pivotally connected to a second link 132. The first link 130 may include a bearing stop 130a formed on an end of the first link 130 for interfacing with a bearing stop 132a formed on an end of the second link 132. For example, FIG. 6 illustrates the first and second links 130, 132 abutting one another at the bearing stops 130a, 132a. The bearing stops 130a, 132a may limit the amount of lateral movement of the first and second links 130, 132 from a centerline 148 extending between the connecting pins 146 (i.e., pivot points) connecting the first and second links 130, 132 to the yoke 100 and end fitting 140, respectively.

The first link 130 may be pivotally connected to the yoke 100 by a connecting pin 146 as indicated above. The second link 132 may also be pivotally connected to the end fitting 140 by a connecting pin 146. The connection between the second link 132 and the end fitting 140 may be arranged to prevent bending loads on the SMA linear actuator 120. In this regard, a guide 142 may be included with the end fitting 140. The guide 142 may be pivotally mounted to the end fitting 140 and may be axially slidably mounted within a guide bore 144 formed in the housing 12. The guide 142 may minimize or prevent lateral loading of the SMA linear actuator 120 while allowing the SMA linear actuator 120 to linearly contract and extend in response to heating and cooling of the SMA linear actuator 120.

Referring still to FIG. 6, the SMA linear actuator 120 may include a free end 126 that may be fixedly coupled to the end fitting 140. The free end 126 of the SMA linear actuator 120 is free in the sense that the free end 126 may move axially under the linear contraction or extension of the SMA linear actuator 120 in response to heating and cooling thereof. The fixed end 124 of the SMA linear actuator 120 may be fixedly coupled to the housing 12. For example, in the non-limiting embodiment illustrated in FIG. 6, the SMA linear actuator 120 may be inserted into a bore formed in the housing 12. The fixed end 124 may include a flange that may be mounted against an interior side of the housing 12. A retainer mechanism 96 such as a snap ring may be mounted to the fixed end 124 on an exterior side of the housing 12. As may be appreciated, the fixed end 124 may be mounted to the housing 12 in any one of a variety of alternative arrangements for fixedly coupling the fixed end 124 to the housing 12.

The SMA linear actuator 120 may be formed as a generally hollow tubular member such that a heater 122 may be housed within the SMA linear actuator 120. For example, the heater 122 may comprise a cartridge heater 122 that may be inserted into the SMA linear actuator 120 for applying thermal energy or heat to the SMA linear actuator 120. The SMA linear actuator 120 may be trained to linearly contract when heated. The linear contraction of the SMA linear actuator 120 causes pivoting of the yoke 100 resulting in pressure applied to the clutch plates and engagement of the clutch 60. The engagement of the clutch 60 rotatably couples the clutch shaft 62 to the output shaft 90 such that the clutch shaft 62 and output shaft 90 rotate substantially in unison as described in greater detail below.

The SMA linear actuator 120 may be constructed from an SMA material, such as nitinol, or any other suitable SMA material, such as a nickel-titanium compound or other suitable compounds. The SMA material may have a two-way shape effect to allow the SMA linear actuator 120 to linearly contract from an un-contracted length in a martensite condition to a contracted length when heated to an austenite condition and to linearly un-contract (i.e., extend) when heat dissipates from the SMA linear actuator 120. In this regard, the SMA linear actuator 120 undergoes shape change when heated from a first temperature, corresponding to the martensite un-contracted length, to a second temperature, corresponding to the austenite contracted length. The SMA linear actuator 120 may be trained to linearly contract by applying tensile stress (e.g. 15-20 ksi) to the SMA linear actuator 120 when in a martensite condition and heat-cycling the SMA linear actuator 120 through the austenite condition. The material from which the SMA linear actuator 120 is fabricated may provide up to at least approximately 4% or greater recoverable strain when the SMA linear actuator 120 is heated from the first temperature to the second temperature. In this regard, the sizing and shape of the SMA linear actuator 120 may be based upon the amount of recoverable strain occurring in the SMA material upon heating from the austenite condition to the martensite condition.

For example, for a 4.0 inch length of the SMA linear actuator 120, a 3% recoverable strain upon heating of the SMA linear actuator 120 would result in approximately 0.12 inch of linear contraction of the SMA linear actuator 120. The amount of linear contraction may be based upon the amount of axial movement required to engage the inner clutch plates 76 to the outer clutch plates 78 of the clutch 60. For example, each one of the inner and outer clutch plates 76, 78 may have a certain amount of waviness or out-of-plane distortion which may result from the manufacturing process of fabricating the inner and outer clutch plates 76, 78. The SMA linear actuator 120 may be sized to have a length accounting for the cumulative effect of the waviness of the inner and outer clutch plates 76, 78. If each one of the inner and outer clutch plates 76, 78 has a waviness of approximately 0.003 inch, then a total of fourteen clutch plates would require a minimum of approximately 0.042 inch of axial displacement to accommodate waviness in the inner and outer clutch plates 78 such that the inner and outer plates 76, 78 may be frictionally engaged to one another. Additional axial displacement may be required in order to accommodate hysteresis, thermal expansion of the actuator assembly components, and manufacturing and assembly tolerances.

FIGS. 13-16 illustrate the mounting of a pair of SMA ribbons 150 to the actuator system 10. As indicated above, the SMA ribbons 150 provide a means to disengage the clutch 60 in a relatively short period of time (e.g., in 300 milliseconds or less). The SMA ribbons 150 may be oriented in substantially parallel relation to one another and may extend between the yoke 100 and a bellcrank 160 that may be mounted to the housing 12. Each one of the SMA ribbons 150 may be formed in a relatively small diameter to facilitate relatively rapid heating of the SMA ribbons 150. Rapid heating of the SMA ribbons 150 may facilitate linear contraction of the SMA ribbon 150 in a relatively short period of time and relatively rapid disengagement of the clutch 60. The SMA ribbons 150 may be trained to linearly contract or shorten when heated from a first temperature corresponding to a martensite condition of the SMA ribbons 150 to a second temperature corresponding to an austenite condition of the SMA ribbons 150.

The SMA ribbons 150 may be heated by applying electrical current to cause electrical resistance heating of the SMA ribbons 150. Advantageously, SMA materials have relatively high electrical resistance resulting in relatively rapid heating of the SMA ribbons 150. The SMA ribbons 150 may be formed from nickel-titanium material such as nitinol or other suitable SMA materials. The SMA ribbons 150 may be provided in a length that provides an amount of linear contraction for moving the over-center linkage 128 from the locked position 136 toward the collapsed position 138 as described below. In an embodiment, the SMA ribbons 150 may be machined from a solid block or billet of SMA material such as by electrical discharge machining (EDM). By machining the SMA ribbons 150, the SMA ribbons 150 may be accurately formed in the desired thickness profile. In addition, eyelets 152 (FIG. 7) may be integrally machined into the SMA ribbons 150. A fitting 158 may also be machined into an end of the SMA ribbons 150 opposite the eyelets 152. The fitting 158 may facilitate pivotable connection of the SMA ribbons 150 to the bellcrank 160.

Figure 16:
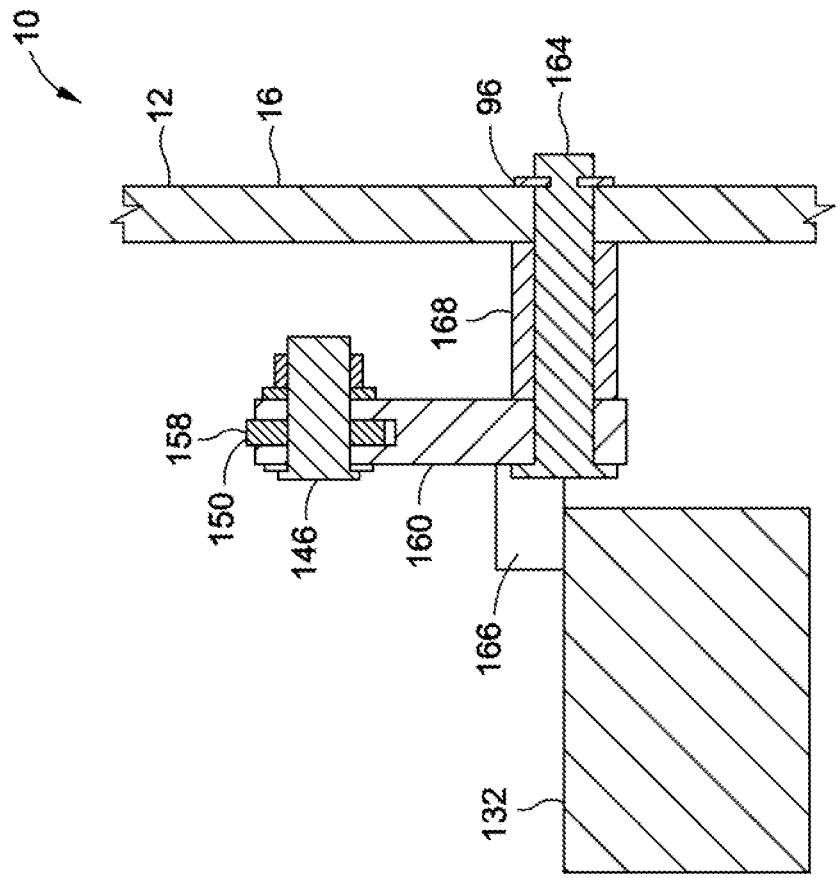
FIG. 16 is an end sectional illustration of the actuator system taken along line 16 of FIG. 15 and illustrating the bellcrank pivotably mounted to the housing.

As shown in FIG. 15, the eyelets 152 may be mounted to the yoke 100 by means of electrically insulated standoffs 154. Electrical leads 156 at the ends of the SMA ribbons 150 may be coupled to a power source (not shown) for applying current to the SMA ribbons 150 when disengagement of the clutch 60 is desired. The SMA ribbons 150 may be pivotally connected to the bellcrank 160 by means of the fitting 158 machined into the SMA ribbons 150. A connecting pin 146 may extend through an upper end of the bellcrank 160 and through the fitting 158 as shown in FIGS. 14-16 to couple the SMA ribbons 150 to the bellcrank 160. The bellcrank 160 may be pivotably mounted to the housing 12 by means of a spacer 168 and bellcrank pivot pin 164. The bellcrank pivot pin 164 may extend through a bore formed in the housing 12 and may be retained by a retainer mechanism 96. As may be appreciated, the bellcrank 160 may be pivotably mounted to the housing 12 by any one of a variety of alternative arrangements and is not limited to the arrangement illustrated in FIG. 16. For example, the bellcrank 160 pin may be threadably engaged to a boss (not shown) formed on an interior side of the housing 12.

Referring to FIGS. 13-16, the bellcrank 160 may include a bellcrank stub 166 for applying lateral force to the over-center linkage 128. The bellcrank stub 166 may be integrally formed with the bellcrank 160 or the bellcrank stub 166 may be formed as a separate component that may be mounted to the bellcrank 160. The bellcrank 160 may pivot in response to linear contraction of the SMA ribbons 150 upon heating of the SMA ribbons 150. The pivoting of the bellcrank 160 may cause the bellcrank stub 166 to contact the first and/or second link 130, 132 and apply lateral force thereto. The bellcrank stub 166 may be positioned in a manner to apply lateral force to the end of at least one of the first and second links 130, 132. The application of lateral force may move the over-center linkage 128 (i.e., move the joined ends of the first and second links 130, 132) from the locked position 136 on one side of the centerline 148 toward a collapsed position 138 on an opposite side of the centerline 148 under the load of the heated (i.e., linearly contracted) SMA linear actuator 120. The collapse of the over-center linkage 128 may result in disengagement of the clutch 60. Disengagement of the clutch 60 may allow the deployable device 210 to rotate freely as described in greater detail below.

Figure 17:
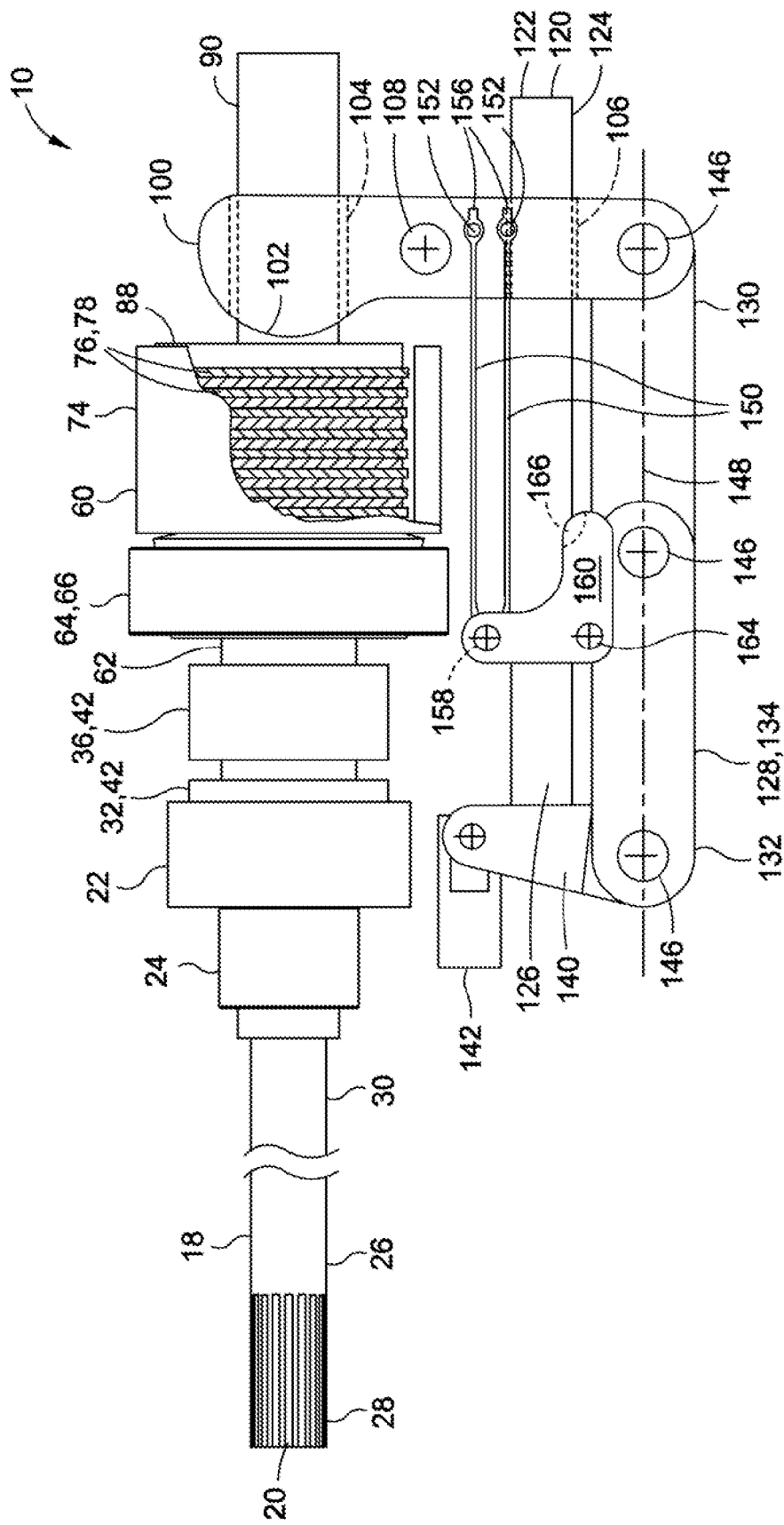
FIG. 17 is a side view of the actuator system with the clutch disengaged and the over-center linkage in a centered position.

Referring to the schematic diagrams of FIGS. 20-24 and with additional reference to the flow diagrams of FIG. 25-27 and the actuator assembly illustrations of FIGS. 17-19, the methodologies of operating the actuator assembly 10 will be described.

Figure 25:
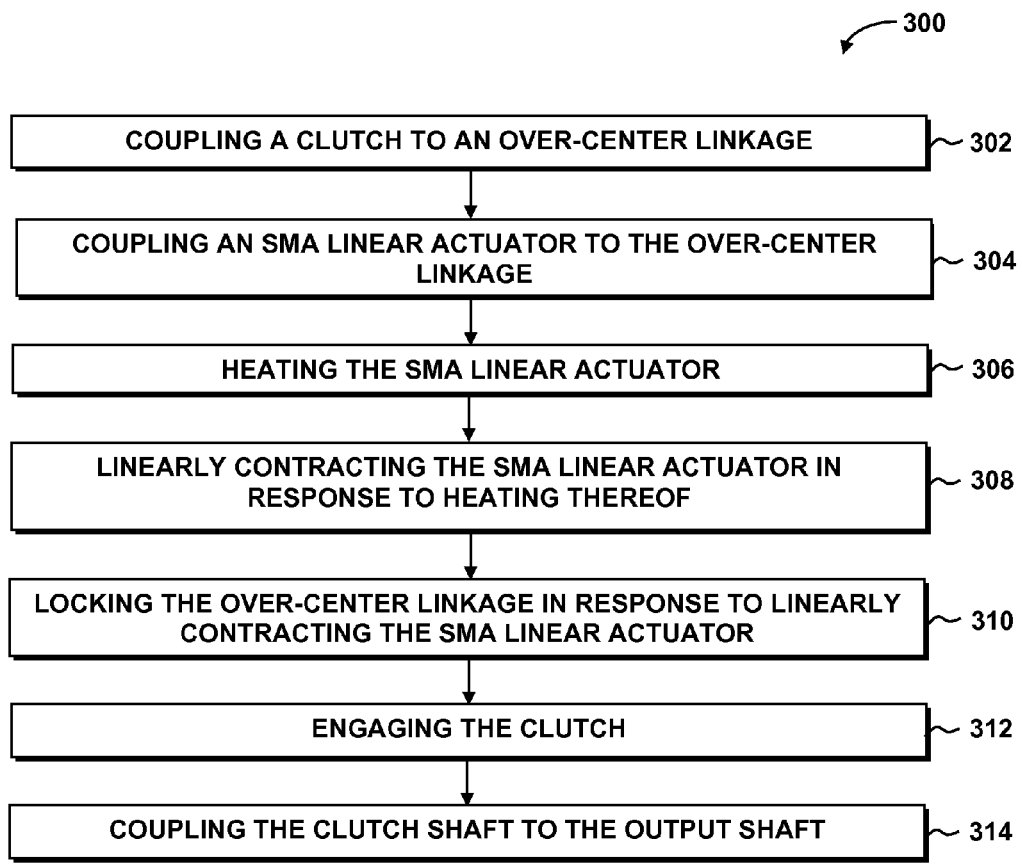
FIG. 25 is an illustration of a flow diagram representing one or more operations that may be included in a methodology of engaging a clutch using an SMA linear actuator.

In the flow diagram of FIG. 25, shown is a methodology 300 of engaging the clutch 60 using the SMA linear actuator 120. In Step 302 of the methodology 300, the clutch 60 may be coupled to the over-center linkage 128. For example, FIGS. 17 and 20 illustrate the yoke 100 coupled to the over-center linkage 128. The yoke 100 may include a protrusion 102 which may be placed in contact with the bearing plate 88 to apply pressure to the clutch plates 76, 78 when the yoke 100 is pivoted about the yoke pivot pin 108.

Step 304 of the methodology 300 of FIG. 25 may include coupling the SMA linear actuator 120 to the over-center linkage 128. As shown in FIGS. 17 and 20, the free end 126 of the SMA linear actuator 120 may be fixedly coupled to the end fitting 140. FIG. 20 schematically illustrates the SMA linear actuator 120 at a first temperature $T_{1\text{-}LA}$ corresponding to a martensite condition of the SMA linear actuator 120 and which additionally corresponds to a first length $l_{1\text{-}LA}$ of the SMA linear actuator 120. When the SMA linear actuator 120 is at the first temperature $T_{1\text{-}LA}$, the over-center linkage 128 may be in a centered position 134 as shown in FIG. 17 wherein the first and second links 130, 132 are generally aligned with one another.

Step 306 of the methodology 300 of FIG. 25 may include heating the SMA linear actuator 120 to raise the temperature of the SMA linear actuator 120 from the first temperature $T_{1\text{-}LA}$ to the second temperature $T_{2\text{-}LA}$. FIG. 21 schematically illustrates the SMA linear actuator 120 in cross-hatching to indicate the heating of the SMA linear actuator 120 to the second temperature $T_{2\text{-}LA}$.

Step 308 of the methodology 300 of FIG. 25 may include linearly contracting the SMA linear actuator 120 in response to heating thereof. As shown in FIG. 21, the SMA linear actuator 120 is linearly contracted from the first length $l_{1\text{-}LA}$ to a second length $l_{2\text{-}LA}$. Due to the linear contraction of the SMA linear actuator 120, the over-center linkage 128 may be moved from the centered position 134 illustrated in FIGS. 17 and 20 to the locked position 136 illustrated in FIGS. 18 and 21. Although not shown, the over-center linkage 128 may include a biasing mechanism to bias the over-center linkage 128 from the centered position 134 (i.e., past the centerline 148) toward the locked position 136 shown in FIG. 18.

In Step 310 of the methodology 300 of FIG. 25, the over-center linkage 128 may be locked in the locked position 136 wherein the bearing stops 130a, 132a (FIG. 14) of the respective first and second links 130, 132 may be abutted against one another to limit the extent of lateral movement of the joined ends of the first and second links 130, 132. In response to the linear contraction of the SMA linear actuator 120, the yoke 100 may be pivoted about the pivot pin 108 as shown in FIGS. 18 and 21. The protrusion 102 of the yoke 100 applies pressure to the bearing plate 88 causing frictional contact between the inner and outer clutch plates 76, 78.

Step 312 of the methodology 300 of FIG. 25 may include engaging the clutch 60 in response to the pivoting the yoke 100 resulting from the linear contraction of the SMA linear actuator 120 when heated. FIGS. 18 and 21 illustrate the clutch 60 in the engaged position. The SMA linear actuator 120 may remain heated to maintain the clutch 60 in the engaged position. The clutch shaft 62 may initially be in a first rotational position $\theta_1$ as illustrated in FIG. 21.

Figure 18:
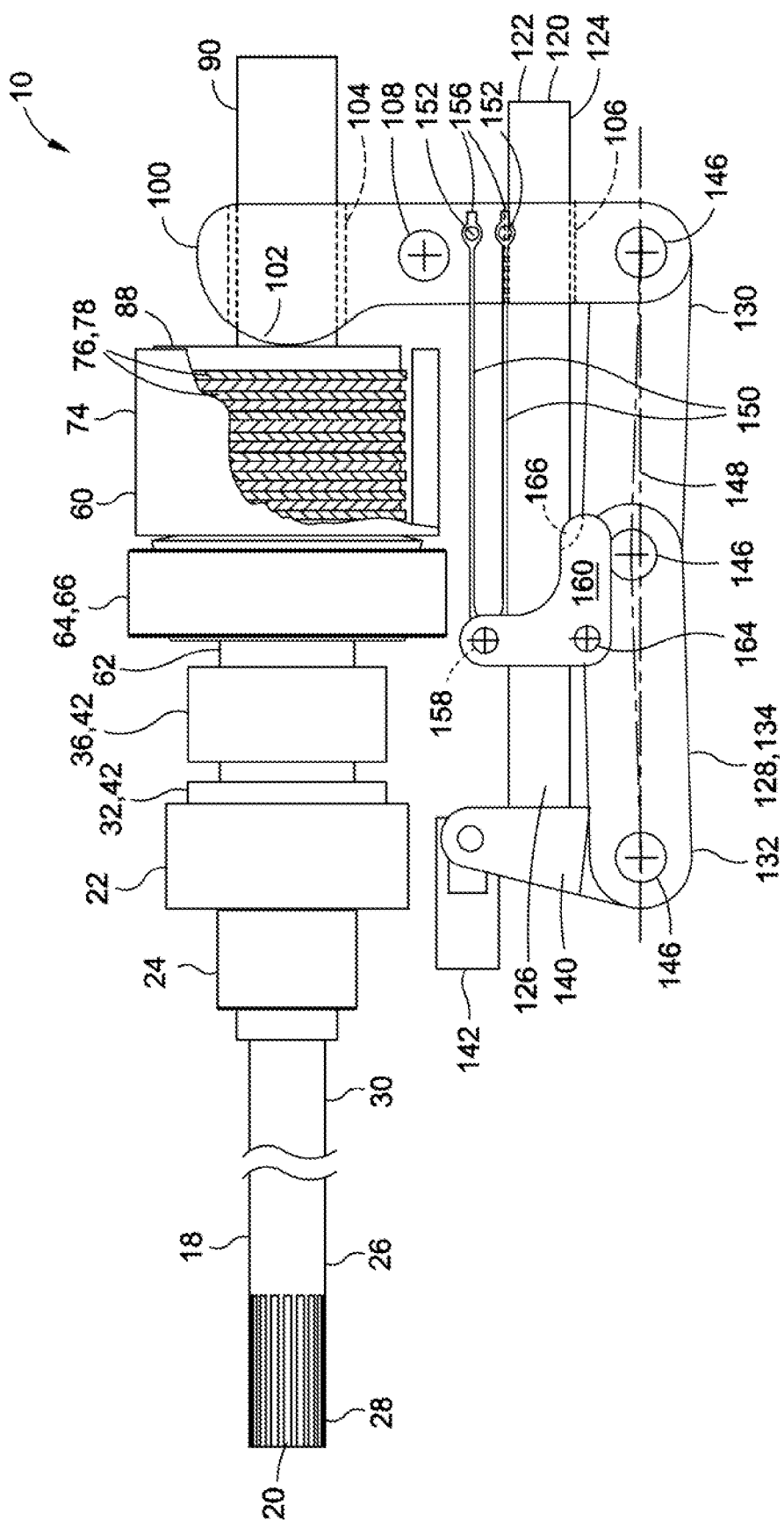
FIG. 18 is a side view of the actuator system with the SMA linear actuator linearly contracted during heating causing the over-center linkage to move into a locked position and resulting in engagement of the clutch.

Step 314 of the methodology 300 of FIG. 25 may include coupling the clutch shaft 62 to the output shaft 90 in response to engagement of the clutch 60 as shown in FIG. 18. The output shaft 90 may be coupled to the deployable device 210 (FIG. 2). The output shaft 90 may include splines 94 (FIG. 4) for coupling to the deployable device 210 such that output shaft 90 and deployable device 210 rotate substantially in unison when the clutch shaft 62 is rotated.

Figure 26:
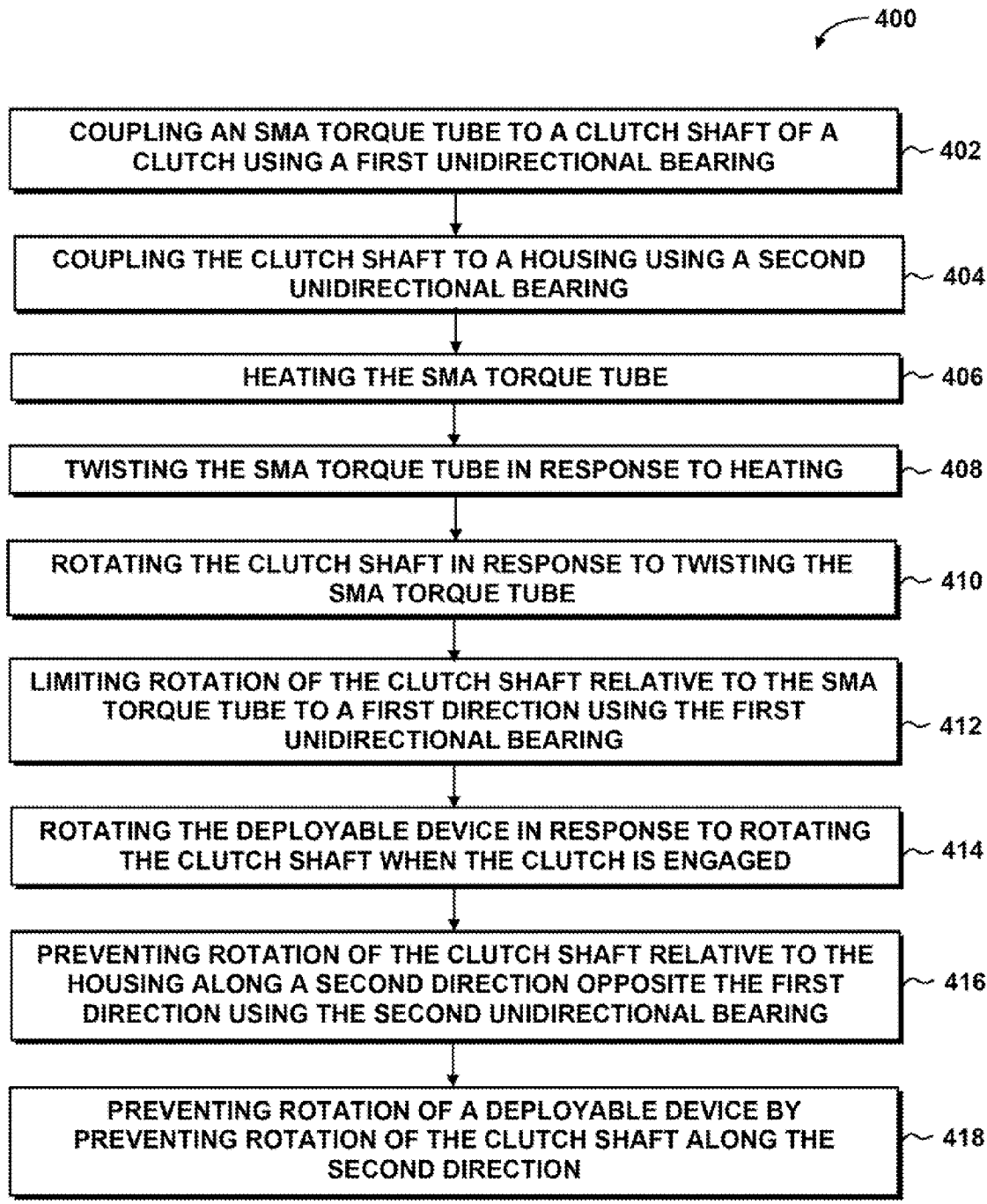
FIG. 26 is an illustration of a flow diagram representing one or more operations that may be included in a methodology of rotating and locking a clutch shaft of an actuator system.

Referring now to the flow diagram of FIG. 26, shown is a methodology 400 of rotating the clutch shaft 62 using the SMA torque tube 18. In Step 402 of the methodology 400, the SMA torque tube 18 may be rotatably coupled to the clutch shaft 62 using the first unidirectional bearing 32. The outer race 48 of the first unidirectional bearing 32 may be fixedly mounted to the drive end 30 of the SMA torque tube 18 using the key 40 illustrated in FIG. 9. The inner race 44 of the first unidirectional bearing 32 may be fixedly mounted to the clutch shaft 62 using the key 40 or other suitable means.

Step 404 of the methodology 400 of FIG. 26 may include rotatably coupling the clutch shaft 62 to the housing 12 using the second unidirectional bearing 36. The outer race 48 of the second unidirectional bearing 36 may be fixedly mounted to the housing 12 using the key 40 as shown in FIG. 10. The inner race 44 of the second unidirectional bearing 36 may be fixedly mounted to the clutch shaft 62 using the key 40.

Figure 22:
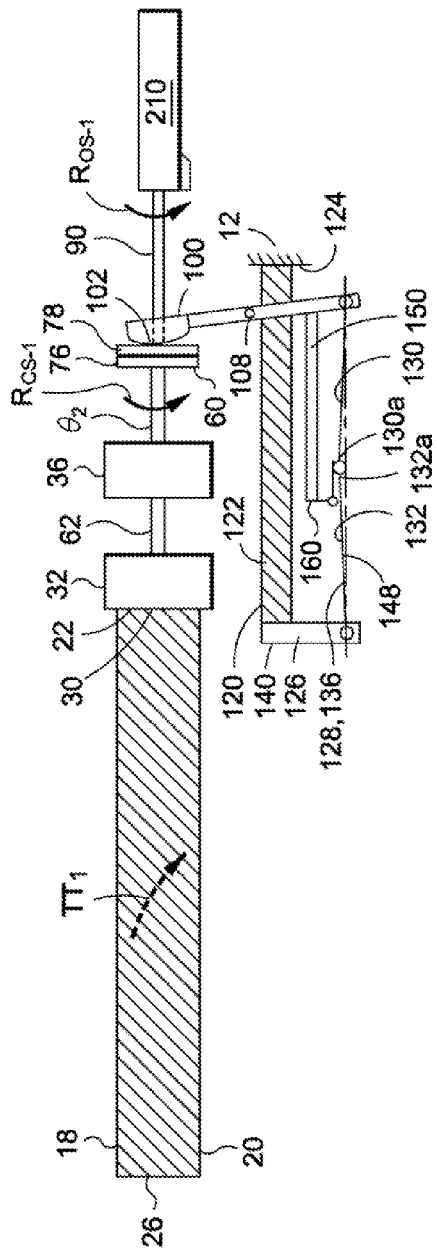
FIG. 22 is a schematic illustration of the actuator system wherein the SMA torque tube is heated causing twisting thereof and rotation of the clutch shaft and deployable device from a first rotational position to a second rotational position.

Step 406 of the methodology 400 of FIG. 26 may include heating the SMA torque tube 18. FIG. 22 illustrates the SMA torque tube 18 in cross-hatching indicating the application of heat. The SMA torque tube 18 may be heated by a heater 122 (FIG. 6) that may be housed within a hollow interior of the SMA torque tube 18. The heater 122 may be electrically powered such as by a power system (not shown) of the aircraft 200 (FIG. 1).

Step 408 of the methodology 400 of FIG. 26 may include twisting the SMA torque tube 18 in response to heating of the SMA torque tube 18. FIG. 22 illustrates a first direction of twisting $TT_1$ of the SMA torque tube 18. The twisting of the SMA torque tube 18 may occur when the SMA torque tube 18 reaches an austenite condition. The twisting of the SMA torque tube 18 in response to heating comprises an untwisting of the SMA torque tube 18 from its trained shape toward its original untwisted shape as described above.

Step 410 of the methodology 400 of FIG. 26 may include rotating the clutch shaft 62 in response to twisting the SMA torque tube 18. The first unidirectional bearing 32 transmits twisting motion at the drive end 30 of the SMA torque tube 18 into rotational motion of the clutch shaft 62. FIG. 22 illustrates the clutch shaft 62 rotating along a first direction of rotation $R_{CS-1}$ from the first rotational position $\theta_1$ to a second rotational position $\theta_2$.

Step 412 of the methodology 400 of FIG. 26 may include limiting rotation of the clutch shaft 62 relative to the SMA torque tube 18 to a first direction 34 (FIG. 9). For example, FIG. 9 illustrates the arrangement of the first unidirectional bearing 32 such that the rotation of the clutch shaft 62 is limited to a clockwise direction relative to the SMA torque tube 18. Rotation of the clutch shaft 62 in a counter-clockwise direction relative to the SMA torque tube 18 is prevented.

Step 414 of the methodology 400 of FIG. 26 may include rotating the deployable device 210 in response to rotating the clutch shaft 62 when the clutch 60 is engaged. FIG. 22 illustrates the rotation of the output shaft 90 in the same direction as the rotation of the clutch shaft 62. The output shaft 90 is fixedly coupled to the deployable device 210 such that the deployable device 210 rotates along a first direction of rotation $R_{OS-1}$ in unison with the rotation of the output shaft 90.

Figure 23:
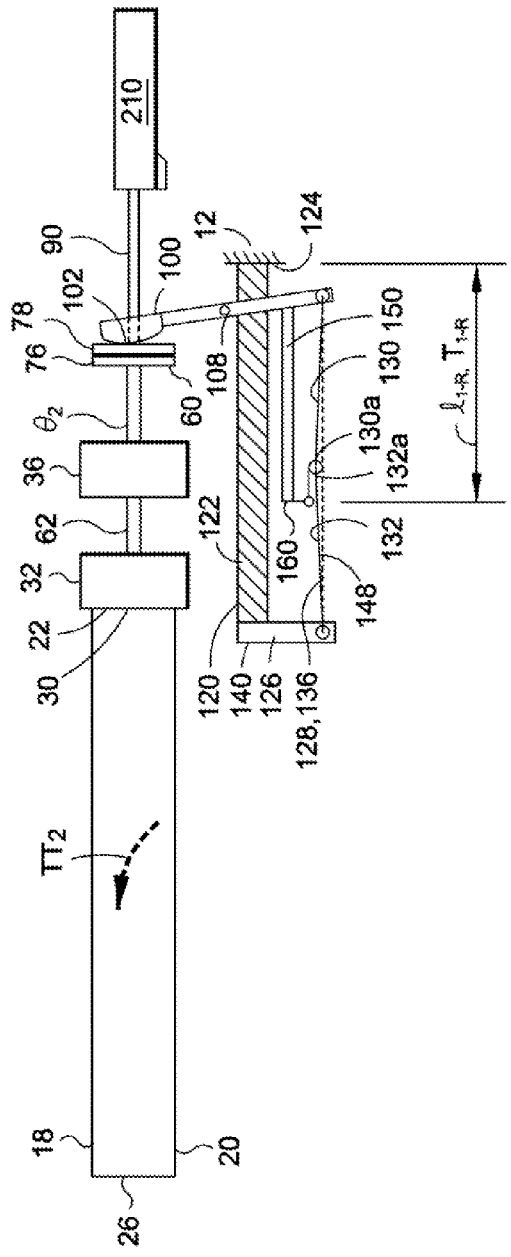
FIG. 23 is a schematic illustration of the actuator system wherein heat is dissipated from the SMA torque tube causing untwisting thereof and further illustrating the clutch shaft and the deployable device being maintained in the second rotational position due to the cooperation of the first and second unidirectional bearings.

Step 416 of the methodology 400 of FIG. 26 may include preventing rotation of the clutch shaft 62 relative to the housing 12 along the second direction 38 of rotation opposite the first direction 34 (FIG. 9). In the exemplary arrangement of the first unidirectional bearing 32 as shown in FIG. 9, the clutch shaft 62 is limited to rotation along a first, counter-clockwise direction relative to the SMA torque tube 18. FIG. 23 illustrates the twisting of the SMA torque tube 18 as a result of de-activation of the heater 122 causing heat to dissipate from the SMA torque tube 18. The dissipation of heat from the SMA torque tube 18 may result in twisting of the SMA torque tube 18 along a direction $TT_2$ (FIG. 23) as the SMA torque tube 18 returns to its trained or twisted shape as described above.

The return of the SMA torque tube 18 to its twisted shape may occur without rotation of the clutch shaft 62 due to the passive locking provided by the second unidirectional bearing 36. For example, FIG. 10 illustrates the second unidirectional bearing 36 arranged to prevent rotation of the clutch shaft 62 in a clockwise direction relative to the housing 12. It should be noted that the first and second unidirectional bearing 34, 36 may be oriented in reverse arrangement to that shown in FIGS. 9 and 10. For example, the first unidirectional bearing 32 may be arranged to limit rotation of the clutch shaft 62 along a first, clockwise direction relative to the SMA torque tube 18 and the second unidirectional bearing 36 may be arranged to prevent rotation of the clutch shaft 62 in a second, counter-clockwise direction relative to the housing 12.

Step 418 of the methodology 400 of FIG. 26 may include preventing rotation of the deployable device 210 in response to preventing rotation of the clutch shaft 62. As shown in FIG. 23, the clutch 60 is maintained in an engaged state due to the continued heating of the SMA linear actuator 120 as indicated by the cross-hatching. The output shaft 90 is therefore maintained in coupling relation to the clutch shaft 62 such that preventing rotation of the clutch shaft 62 prevents rotation of the deployable device 210.

Figure 19:
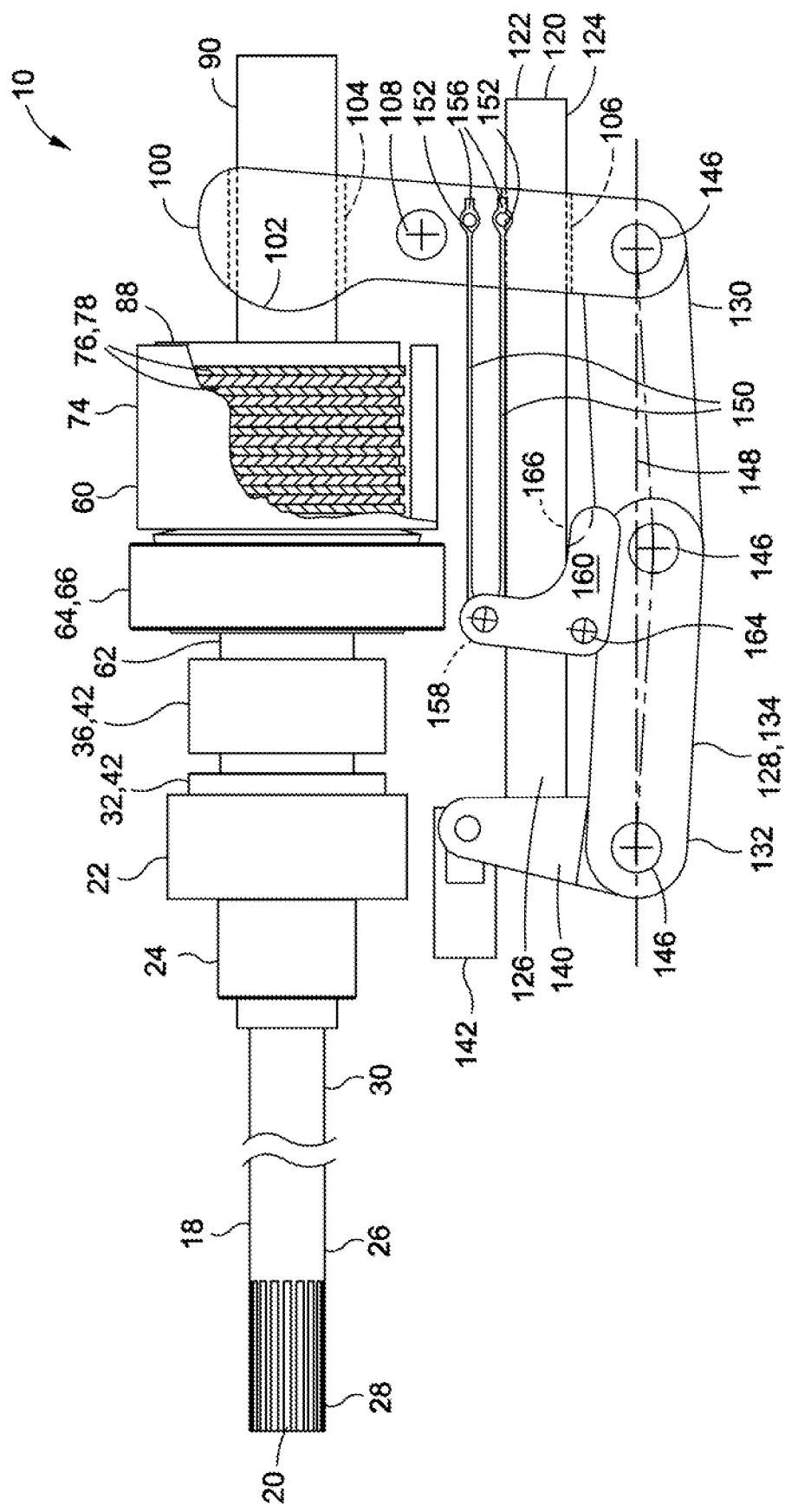
FIG. 19 is a side view of the actuator system with the SMA ribbon linearly contracted during heating causing the over-center linkage to move into a collapsed position and resulting in disengagement of the clutch.
Figure 27:
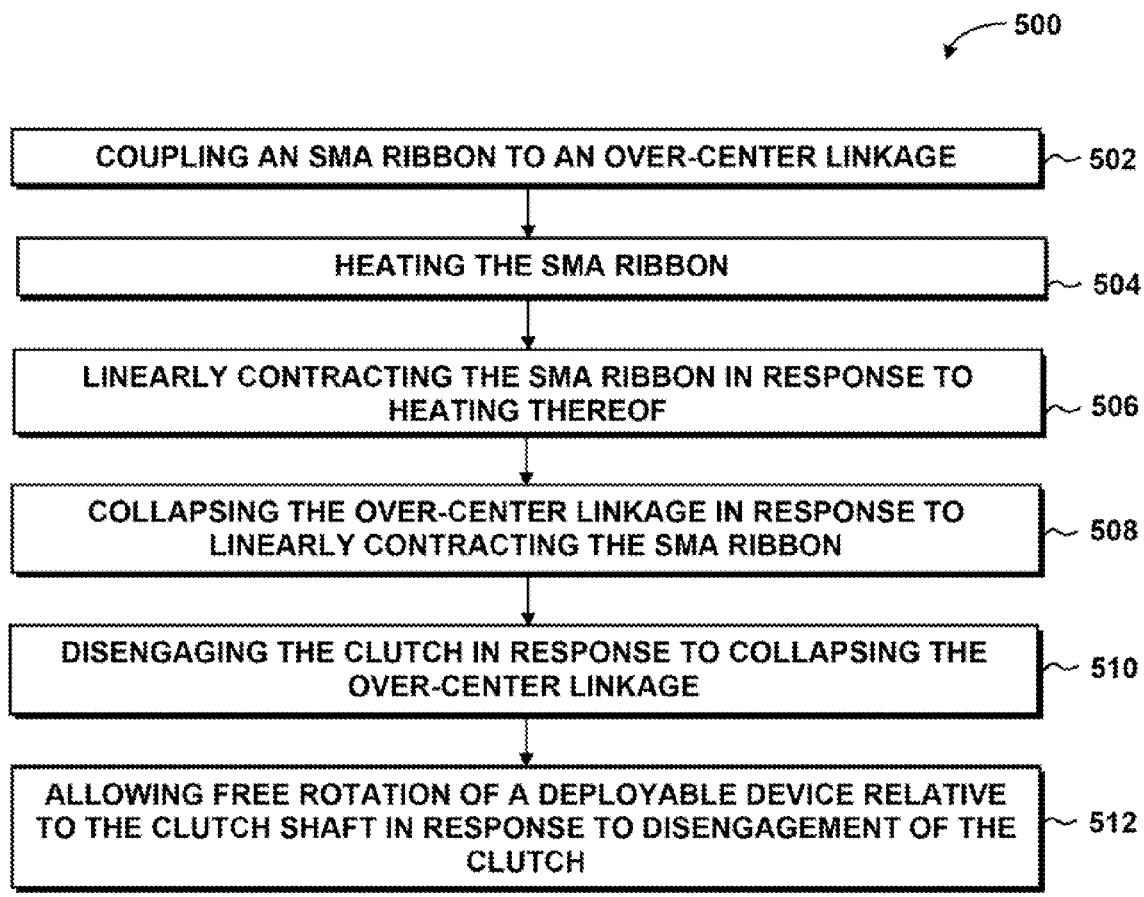
FIG. 27 is an illustration of a flow diagram representing one or more operations that may be included in a methodology of controlling a clutch of an actuator system.

Referring now to the flow diagram of FIG. 27, shown is a methodology 500 of disengaging the clutch 60 using the SMA ribbons 150 and over-center linkage 128 illustrated in FIG. 19. In Step 502 of the methodology 500, the SMA ribbons 150 may be coupled to the over-center linkage 128 by means of the bellcrank 160. The SMA ribbons 150 may extend between the yoke 100 and the bellcrank 160 as shown in FIG. 19.

Step 504 of the methodology 500 of FIG. 27 may include heating the SMA ribbons 150 such as by electrical resistance. The electrical leads 156 of the SMA ribbons 150 may be connected to a power source (not shown) and current may be applied to the SMA ribbons 150. The heating of the SMA ribbons 150 is illustrating by the cross-hatching in FIG. 24.

Figure 24:
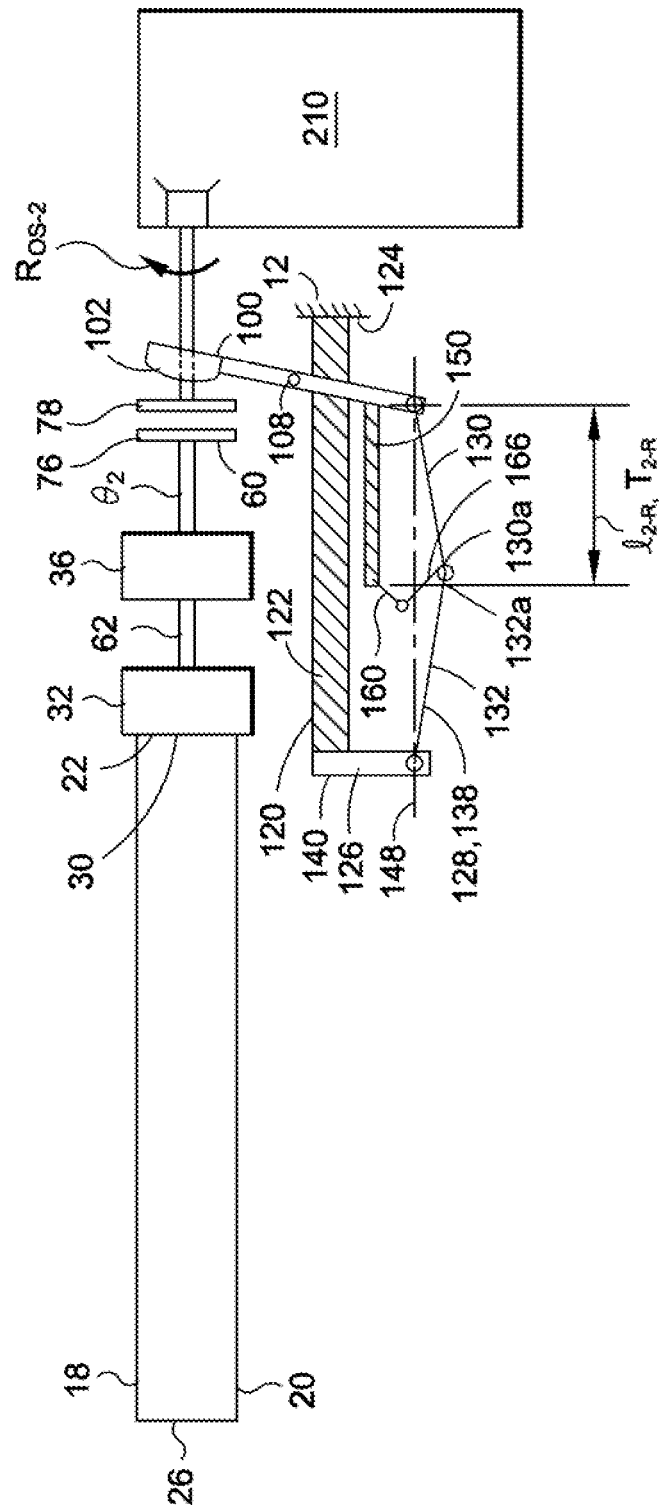
FIG. 24 is a schematic illustration of the actuator system wherein the SMA ribbon is heated causing linear contraction from a first length corresponding to the martensite condition to a second length corresponding to the austenite condition and resulting in collapsing of the over-center linkage and disengagement of the clutch allowing free rotation of the deployable device.

Step 506 of the methodology 500 of FIG. 27 may include linearly contracting the SMA ribbons 150 in response to the heating thereof. As indicated above, the SMA ribbons 150 may be formed in a relatively small diameter or other cross-sectional shape to facilitate relatively rapid heating of the SMA ribbons 150 and correspondingly rapid linear contraction of the SMA ribbons 150. As shown in FIG. 23, the SMA ribbons 150 are at a first length $l_{1-R}$ corresponding to the martensite condition of the SMA ribbons 150 at the first temperature $T_{1-R}$. FIG. 24 illustrates the SMA ribbons 150 heated to a second temperature $T_{2-R}$ corresponding to a linearly contracted second length $l_{2-R}$ in the austenite condition.

Step 508 of the methodology 500 of FIG. 27 may include collapsing the over-center linkage 128 in response to linearly contracting the SMA ribbons 150. FIGS. 13-16 illustrate a bellcrank stub 166 extending outwardly from the bellcrank 160. FIGS. 19 and 25 illustrate the pivoting of the bellcrank 160 in a clockwise direction as a result of the linear contraction of the SMA ribbons 150. The pivoting of the bellcrank 160 results in the bellcrank stub 166 moving the over-center linkage 128 from the locked position 136 (FIGS. 18 and 23) to the collapsed position 138 (FIGS. 19 and 24).

Step 510 of the methodology 500 of FIG. 27 may include disengaging the clutch 60 in response to collapsing the over-center linkage 128. FIGS. 19 and 24 illustrate the yoke 100 pivoted away from the clutch 60 as a result of the collapse of the over-center linkage 128. Axial pressure on the inner and outer clutch plates 76, 78 is removed to the extent that the inner and outer clutch plates 76, 78 may rotate relative to one another.

Step 512 of the methodology 500 of FIG. 27 may include allowing the deployable device 210 to rotate freely relative to the clutch plates 76, 78 in response to disengagement of the clutch 60. For example FIG. 24 illustrates the deployable device 210 rotating along a second direction of rotation $R_{OS-2}$ such as toward a retracted position (not shown) or toward other rotational positions. The deployable device 210 may rotate toward a retracted position in response to aerodynamic forces acting on the deployable device 210 or in response to a biasing mechanism (not shown) biasing the deployable device 210 toward a retracted position.

Upon disengagement of the clutch, the supply of heat to the SMA ribbons 150 and the SMA linear actuator 120 may be halted. Heat may dissipate from the SMA ribbons 150 and the SMA linear actuator 120 such that the SMA ribbons 150 and the SMA linear actuator 120 may linearly extend toward their first lengths $l_{1-LA}$, $l_{1-R}$ as shown in FIG. 20. The over-center linkage 128 may be moved to the centered position 134 illustrated in FIGS. 17 and 20. The process of deploying the deployable device 210 may be repeated by repeating one or more of Steps 300-512.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. An actuator system, comprising:
   a housing;
   a clutch having clutch plates and a clutch shaft, the clutch plates being axially engageable with one another causing the clutch shaft to be coupled to an output shaft;
   a shape memory alloy (SMA) torque tube for rotating the clutch shaft;
   a first unidirectional bearing limiting rotation of the clutch shaft relative to the SMA torque tube to a first direction;
   a second unidirectional bearing preventing rotation of the clutch shaft relative to the housing along a second direction opposite the first direction and
   an over-center linkage coupled to the clutch and configured to axially disengage the clutch plates.

2. The actuator system of claim 1 wherein:
   at least one of the first and second unidirectional bearings is configured as a sprag bearing.

3. The actuator system of claim 1 further comprising:
   an SMA linear actuator linearly contracting when heated in a manner causing engagement of the clutch.

4. The actuator system of claim 3 further comprising:
   an SMA ribbon;
   the SMA linear actuator being coupled to the over-center linkage and linearly contracting when heated causing locking of the over-center linkage and engagement of the clutch;
   the SMA ribbon linearly contracting when heated causing collapse of the over-center linkage and disengagement of the clutch.

5. An actuator system, comprising:
   a clutch having clutch plates and a clutch shaft;
   an over-center linkage;
   a shape memory alloy (SMA) linear actuator coupled to the over-center linkage and linearly contracting when heated causing locking of the over-center linkage and causing the clutch plates to axially engage with one another and causing the clutch shaft to be coupled to an output shaft; and
   an SMA ribbon coupled to the over-center linkage and linearly contracting when heated causing collapse of the over-center linkage and axial disengagement of the clutch plates from one another.

6. The actuator system of claim 5 further comprising:
   a bellcrank configured to collapse the over-center linkage in response to heating of the SMA ribbon.

7. The actuator system of claim 5 further comprising:
   an SMA torque tube;
   the clutch including a clutch shaft; and
   the SMA torque tube being coupled to the clutch shaft for rotating the clutch shaft.

8. The actuator system of claim 7 further comprising:
   a housing;
   a first unidirectional bearing limiting rotation of the clutch shaft relative to the SMA torque tube to a first direction; and
   a second unidirectional bearing preventing rotation of the clutch shaft relative to the housing along a second direction opposite the first direction.

9. The actuator system of claim 7 further comprising:
   an output shaft;
   the clutch coupling the clutch shaft to the output shaft during engagement of the clutch by the SMA linear actuator.

10. A method of rotating a shaft relative to a housing, comprising the steps of:
    coupling a clutch to an over-center linkage;
    axially engaging clutch plates of the clutch having a clutch shaft;
    coupling the clutch shaft to an output shaft in response to axially engaging the clutch plates;
    heating an SMA torque tube;
    twisting the SMA torque tube in response to heating thereof;
    rotating the output shaft in response to twisting the SMA torque tube;
    limiting rotation of the clutch shaft relative to the SMA torque tube to a first direction using a first unidirectional bearing;
    preventing rotation of the clutch shaft relative to the housing along a second direction opposite the first direction using a second unidirectional bearing; and
    disengaging the clutch plates using the over-center linkage.

11. The method of claim 10 further comprising the steps of:
    heating an SMA linear actuator;
    linearly contracting the SMA linear actuator in response to heating thereof; and
    engaging the clutch in response to linearly contracting the SMA linear actuator.

12. The method of claim 10 further comprising the steps of:
    coupling a deployable device to the output shaft; and
    rotating the deployable device in response to heating the SMA torque tube.

13. The method of claim 10 further comprising the steps of:
    coupling the SMA linear actuator to the clutch using the over-center linkage;
    locking the over-center linkage in response to linearly contracting the SMA linear actuator; and
    engaging the clutch in response to locking the over-center linkage and linearly contracting the SMA linear actuator.

14. The method of claim 13 further comprising the steps of:
    coupling an SMA ribbon to the over-center linkage ;
    heating the SMA ribbon;
    linearly contracting the SMA ribbon in response to heating;
    collapsing the over-center linkage in response to linearly contracting the SMA ribbon; and
    disengaging the clutch in response to collapsing the over-center linkage .

15. A method of disengaging a clutch, comprising the steps of:
    coupling the clutch to an over-center linkage , the clutch having clutch plates being axially engaged to one another, the clutch plates being coupled to an output shaft;
    heating an SMA ribbon coupled to the over-center linkage;
    linearly contracting the SMA ribbon in response to the heating thereof;

collapsing the over-center linkage in response to linearly contracting the SMA ribbon; and disengaging the clutch plates in response to collapsing the over-center linkage.

16. The method of claim 15 further comprising the steps of:
coupling the over-center linkage to an SMA linear actuator;
heating the SMA linear actuator;
linearly contracting the SMA linear actuator in response to heating thereof; and
engaging the clutch plates in response to linearly contracting the SMA linear actuator.

17. The method of claim 15 wherein the clutch includes a clutch shaft, the method further comprising the steps of:
coupling an SMA torque tube to the clutch shaft in response to the clutch plates being axially engaged to one another;
heating the SMA torque tube; and
rotating the clutch shaft in response to heating the SMA torque tube.

18. The method of claim 17 wherein the step of coupling the SMA torque tube to the clutch shaft comprises:
coupling the SMA torque tube to the clutch shaft using a first unidirectional bearing;
coupling the clutch shaft to a housing using a second unidirectional bearing;
limiting rotation of the clutch shaft relative to the SMA torque tube to a first direction; and
preventing rotation of the clutch shaft relative to the housing along a second direction opposite the first direction.

19. The method of claim 18 further comprising the steps of:
coupling a deployable device to the output shaft; and
rotating the deployable device in response heating the SMA torque tube.

* * * * *